(12) United States Patent
Segawa et al.

(10) Patent No.: US 6,193,046 B1
(45) Date of Patent: Feb. 27, 2001

(54) TRANSFER APPARATUS TRANSFERRING BODY SIDE OF AUTOMOTIVE VEHICLE AND TRANSFER METHOD THEREOF

(75) Inventors: Teruo Segawa; Kaoru Okuyama; Setsuo Nakamura; Yukihide Ueda; Shoichi Takahashi; Jun Matsubara, all of Kanagawa-ken (JP)

(73) Assignee: Nissan Motor Co., Ltd., Kanagawa-ken (JP)

( * ) Notice: Subject to any disclaimer, the term of this patent is extended or adjusted under 35 U.S.C. 154(b) by 0 days.

(21) Appl. No.: 08/997,997

(22) Filed: Dec. 24, 1997

(30) Foreign Application Priority Data

Dec. 25, 1996 (JP) .................................................... 8-345820
Jan. 24, 1997 (JP) .................................................... 9-011208

(51) Int. Cl.[7] ......................... B65G 29/00; B65G 37/00; B65G 47/84; B65G 49/00
(52) U.S. Cl. .................................... 198/339.1; 198/803.7
(58) Field of Search ......................... 198/867.05, 803.7; 901/42, 43

(56) References Cited

U.S. PATENT DOCUMENTS

| 3,747,737 | 7/1973 | Brooke ........................ 198/803.7 X |
| 3,783,991 | 1/1974 | McCahon et al. ............ 198/803.7 X |
| 4,740,133 | 4/1988 | Kawano ............................ 901/42 X |
| 4,751,995 | 6/1988 | Naruse et al. .............. 198/867.05 X |
| 4,960,969 | 10/1990 | Shigenaka ........................ 901/42 X |

FOREIGN PATENT DOCUMENTS 7-96397    4/1995  (JP) .

*Primary Examiner*—Christopher P. Ellis
*Assistant Examiner*—Gene O. Crawford
(74) *Attorney, Agent, or Firm*—McDermott, Will & Emery

(57) ABSTRACT

A transfer apparatus for transferring a body side of an automotive vehicle is disclosed. A moving body is provided on a transfer line. A clamp member is provided on the moving body to fix and position a lower end of a side sill of the body side in an upright position. As a result, the roof rail end of the body side is an upper portion and the side sill end of the body side outer is a lower portion.

7 Claims, 26 Drawing Sheets

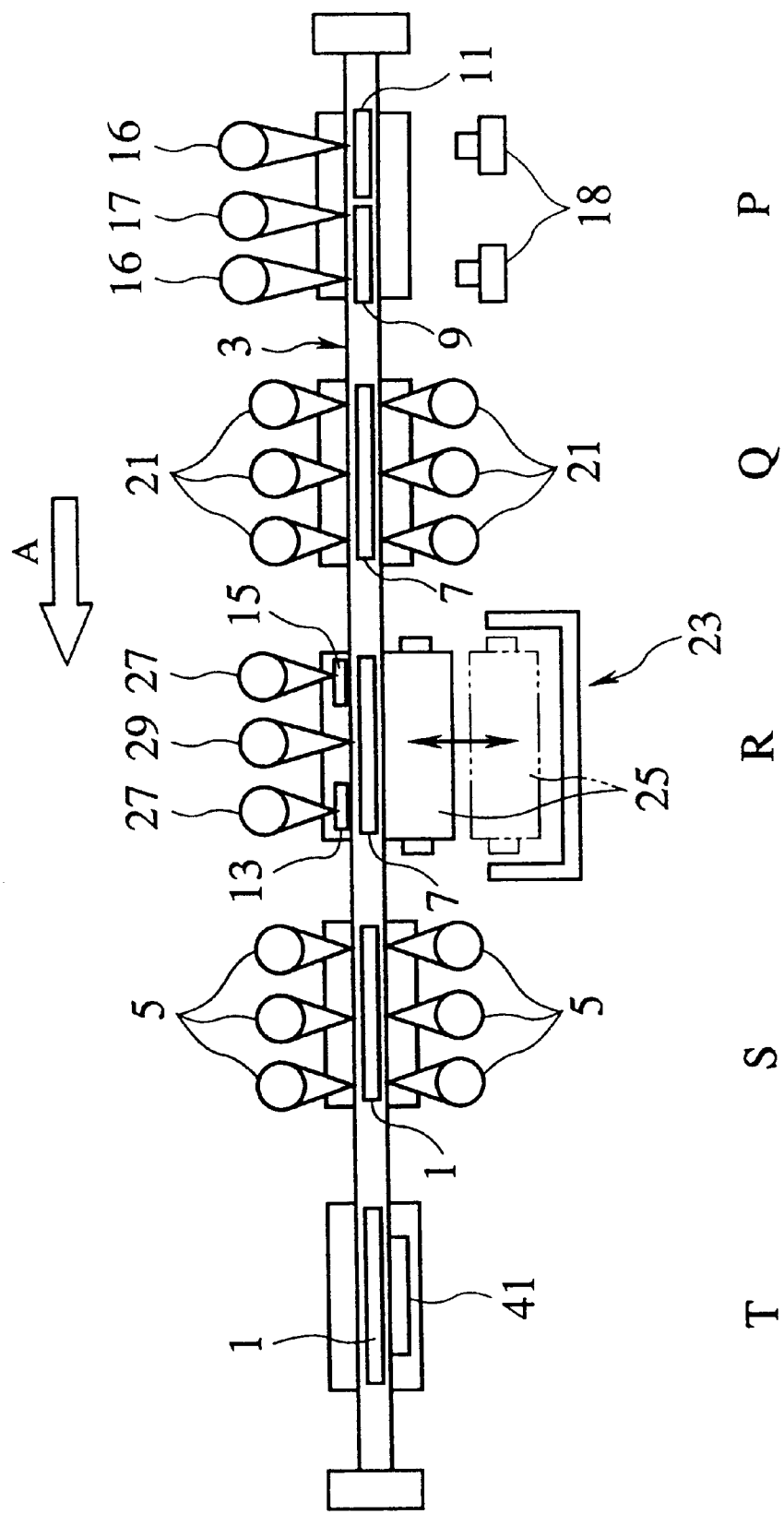

TRANSFER APPARATUS TRANSFERRING BODY SIDE OF AUTOMOTIVE VEHICLE AND TRANSFER METHOD THEREOF

BACKGROUND OF THE INVENTION

1. Field of the Invention

The present invention relates to a transfer apparatus transferring a body side of an automotive vehicle and a transfer method thereof which is used at a time of assembling the body side such as assembling various kinds of inner parts to a body side outer part. More particularly, the present invention relates to a transfer apparatus transferring a body side and a transfer method thereof which comprises a work holding and transferring member moved by a chain where the body side held by the work holding and transferring member is assembled at a predetermined position in a direction of transferring the body side.

2. Description of the Related Art

In a body side of the automotive vehicle, there is a structure which is assembled by a body side outer and a various kinds of inner parts. The body side outer comprises a front part constituting a part disposed in front of a vehicle body and a rear fender part constituting a part disposed in the rear of the vehicle body. The front part and the rear fender part are joined by welding. After welding the front part and the rear fender part to construct the body side outer, the various kinds of inner parts are joined to body side outer by welding. Then the body side of the automotive vehicle is assembled.

In the above assembling operation, as shown in FIG. 1, there is provided a transfer apparatus 205 for transferring a front part 201 and a rear fender part 203 in a state of laying down, for example, as disclosed in Japanese Patent Application Laid-Open Publication No. 7-96397, and a plurality of welding robots 207 for welding the parts 201 and 203 to each other and welding the inner part to the parts 201 and 203.

The transfer apparatus 205 is provided with two transfer bars 209 extending to the transfer direction and capable of moving in the longitudinal direction, and fingers 211 serving as a work receiver for supporting the parts 201 and 203 and disposed on the transfer bar 209. On a table 213 disposed below the transfer bar 209, there is provided a jig 215 which ascends the parts 201 and 203 so as to be apart from the finger 211 and fixedly holds the parts so as to position them at a time of welding. The jig 215 is provided in such a manner as to vertically movable by a lifter. When the finger 211 holding the parts 201 and 203 moves forward together with motion of the transfer bar 209, the parts 201 and 203 are also transferred forward, in a state that the jig 215 is unclamping the parts 201 and 203.

The assembling operation comprises some stages. In a first stage, the front part 201 and the rear fender part 203 are set on the transfer line and fixed and held by the jig 215 which is in an ascent state, and thereafter, both the parts 201 and 203 are temporarily welded to each other by using the welding robots 207. In a second stage, the connection portions for connecting the parts 201 and 203 to each other and small parts which are already assembled to the parts 201 and 203 are additionally welded. Next, in a third stage, the various kinds of inner parts are set to the parts 201 and 203 and are temporarily welded to each other, and thereafter, in a fourth stage, the parts are additionally welded, whereby the welding of the body side is completed.

Finally, in a fifth stage, the body side which is completely welded is stood up by a stand-up apparatus having an oil hydraulic cylinder for a standing-up mechanism, and thereafter is hung up by the stand-up apparatus so as to carry out to the following stage.

However, in the conventional operation of assembling the body side, there are following problems.

(1) In the welding operation for the additional welding by the plurality of welding robots, the welding robots interfere with each other due to an obstruction of the jig 215, thereby deteriorating the operation efficiency.

(2) Since the work W to be assembled as the front part 201 or the rear fender part 203 is supported by the jig 215 at left and right side bottom portions thereof in a state that the work W is laying down in a horizontal direction with respect to the transfer apparatus, the center portion of the work W is bent due to the gravitational force and deformed as shown in FIGS. 2A and 2B. Then, since the welding operation is performed in the bent state, the assembling accuracy is deteriorated. When the jig for supporting the center portion in order to prevent the center portion from bending, the cost is increased, and the operable area for the welding robot is narrowed.

(3) Since at a time of performing the welding operation and the transfer operation, it is necessary to provide a plurality of special jigs 215 and fingers 211 for fixing and holding the bottom surface of the works as the front parts 201 and the rear fender parts 203 in the laying down state, the facility cost is required. Particularly, when a plurality types of automotive vehicle are produced in the same line, it is necessary to provide the jigs and fingers for a wide ranged usage so that the facility cost is extremely high. Further, the stand-up apparatus for standing the work up after welding requires also a high cost.

SUMMARY OF THE INVENTION

The present invention has been achieved with such points in view.

It therefore is an object of the present invention to provide a transfer apparatus and method transferring a body side of an automotive vehicle with a reduced cost, an improved. operation efficiency and an improved transfer accuracy in transferring a body side at a time of assembling the body side.

It is another object of the present invention to provide a transfer apparatus and method transferring a body side of an automotive vehicle with an improved positioning accuracy at a time of transferring the body side to a predetermined position.

To achieve the objects, according to an aspect of the present invention, there is provided a transfer apparatus transferring a body side of an automotive vehicle, comprising; a moving body provided in a transfer line; and a clamp member provided on the moving body for clamping a lower end of a side sill of a body side outer in an upright position in such a manner that a roof rail end of the body side outer is an upper portion and the side sill end of the body side outer is a lower portion.

In accordance with the transfer apparatus transferring the body side of the automotive vehicle, since a lower end of the side sill constructing the body side can be made the same shape between different kinds of cars, the lower end of the side sill can be fixed in an upright position, so that it is unnecessary to provide a special jig for each of the kinds of cars for fixing and holding the body side outer. Accordingly, the fixing device for positioning and fixing the body side outer can be easily simplified and used for various kinds of cars. Further, in case a plurality of welding robots perform a welding operation with respect to the body side outer in an upright position, interference between the robots can be avoided so that the operation efficiency can be improved. Further, since the body side outer is transferred and welded in the upright position corresponding to a direction in which a bending rigidity in a cross section of the work becomes maximum with respect to a direction of operating the own weight of the body side outer, the body side outer is hard to be deformed in comparison with the state of horizontally laying down, so that the assembling accuracy can be improved and a space for operation can be reduced.

According to another aspect of the present invention, there is provided a transfer apparatus transferring a body side of an automotive vehicle, comprising; a work holding and transferring member for holding and transferring the work to be operated at a predetermined transfer position of the chain is attached to the chain wound between a pair of sprockets; an operating position detecting means for detecting a state that the work holding and transferring member becomes a predetermined operating position with respect to the held work is provided; and a tension applying mechanism for applying a tension against the chain between both sides of the work transfer direction of the work holding and transferring member when the operating position detecting means detects a predetermined operating position state of the work holding and transferring member.

In accordance with the structure mentioned above, when the operating position detecting means detects the state that the work holding and transferring member becomes a predetermined operating position with respect to the work, the tension is generated on both sides of the chain in the work transferring direction of the work holding and transferring member by the operation of the tension applying mechanism, whereby a predetermined operating position of the work can be secured.

Since the work holding and transferring member applied a tension to the chain on both sides of the work holding and transferring member in the work transferring direction in a state that the work holding and transferring becomes a predetermined operating position with respect to the work, a predetermined operating position with respect to the work can be secured.

According to still another aspect of the present invention, there is provided a transfer method transferring a body side of an automotive vehicle, comprising the steps of: clamping the body side by a clamp member provided on the moving body for fixing and positioning a lower end of a side sill of a body side outer in an upright position in such a manner that a roof rail end of the body side outer is an upper portion and the side sill end of the body side outer is a lower portion; and transferring the body side in the upright position by a moving body provided with the clamp member and provided in a transfer line.

In accordance with the transfer method mentioned above, the same function and the same effect as those of the primarily former aspect mentioned above can be obtained.

According to further aspect of the present invention, there is provided a transfer method transferring a body side of an automotive vehicle, comprising the steps of: positioning a work holding and transferring member such that the work holding and transferring member for holding and transferring the work is attached to a chain wound between a pair of sprockets; and positioning the work to become a predetermined operating position at a time of operating a predetermined operation with respect to the work held by the work holding and transferring member.

In accordance with the work transfer method mentioned above, since the work holding and transferring member transferred by the chain the total length of which is changed due to the abrasion of the pin and the temperature change is positioned and fixed at the predetermined operating position with respect to the held work, the operation accuracy, for example, the welding accuracy in the case that the operation with respect to the positioned and fixed work is welding operation by the robots is improved.

BRIEF DESCRIPTION OF THE ACCOMPANYING DRAWINGS

The above and further objects and novel features of the present invention will more fully appear from the following detailed description when the same is read in conjunction with the accompanying drawings, in which:

FIG. 3 is a plan view which schematically shows a total structure of a transfer apparatus for transferring a body side of an automotive vehicle in accordance with an embodiment of the present invention;

DETAILED DESCRIPTION OF THE PREFERRED EMBODIMENTS

Figure 1:
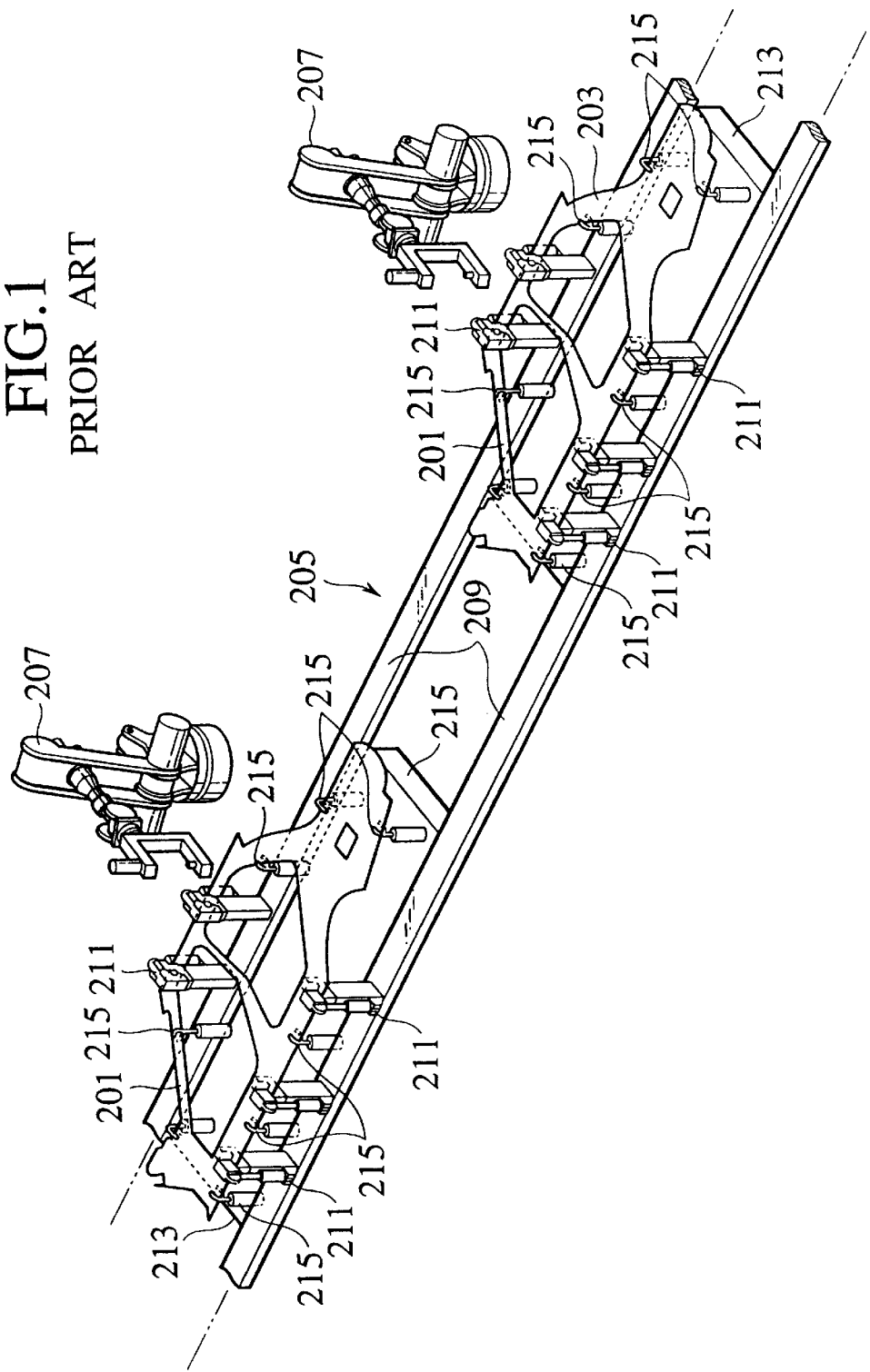
FIG. 1 is a perspective view which schematically shows a transfer apparatus for transferring a body side of an automotive vehicle in accordance with the related art.

There will be detailed below the preferred embodiments of the present invention with reference to the accompanying drawings. Like members are designated by like reference characters.

A transfer apparatus for transferring a body side of an automotive vehicle in accordance with an embodiment of the present invention is structured in such a manner as to position and fix the body side on a transfer apparatus constituting a transfer line in an upright position in which a roof rail end is set to be an upper portion and a side sill end is set to be a lower portion. A plurality of welding robots are disposed in both sides of the transfer apparatus. The body side comprises a body side outer, which is formed by welding a front part constituting body parts surrounding a front door of the vehicle and a rear fender part constituting a rear fender, a rear quarter pillar, etc., front inner parts and wheel house/rear pillar inner parts to be welded to the body side outer.

FIG. 3 is an operation process drawing which schematically shows a total line of the assembling apparatus for the body side, in which a transfer direction is from the right to the left in the drawing as shown in an arrow A. A first stage P corresponds to a stage at a position shown in FIG. 5, and in the stage, after a front part 9 and a rear fender part 11 are set on a transfer apparatus 3 by work set robots 16, a connecting portion K between the respective parts 9 and 11 are temporarily joined by welding by means of a welding robot 17. A guide post 18 for positioning each work set robot 16 at a time of setting the work is provided at a position opposite to each work set robot 16 with respect to the transfer apparatus 3.

In a second stage Q, a body side outer 7 constituted by welding the respective parts 9 and 11 to each other is additionally welded by welding robots 21 disposed in both sides of the transfer apparatus 3.

Figure 6:
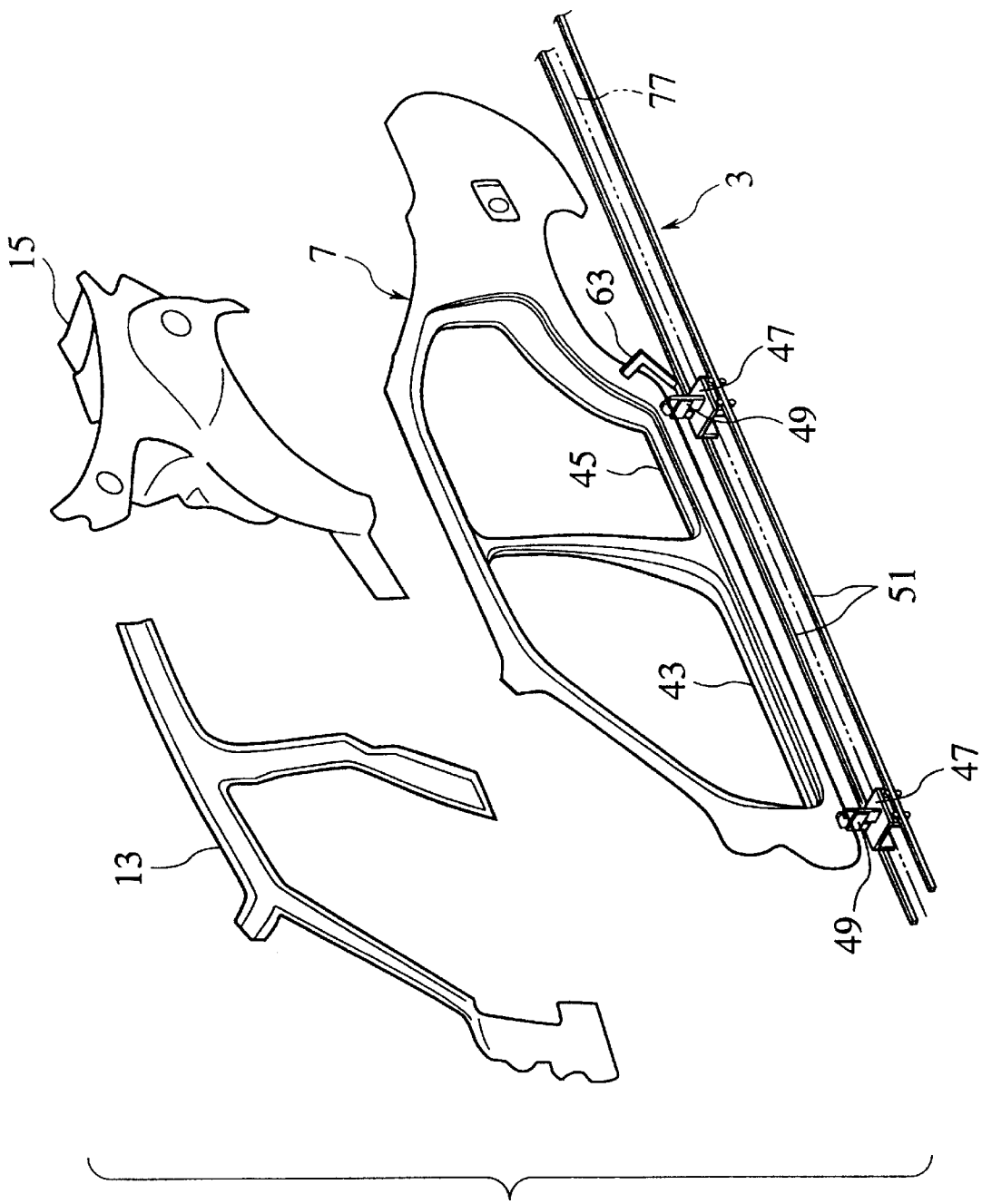
FIG. 6 is a perspective view showing a state in which an inner part is set to the body side outer assembled on the transfer line of the assembling apparatus shown in FIG. 4.

In a third stage R, an inner part consisting of a front inner part 13 and a wheel house rear pillar inner part 15 shown in FIG. 6 is assembled to the body side outer 7 additionally welded in the second stage Q, by a temporary welding.

Figure 4:
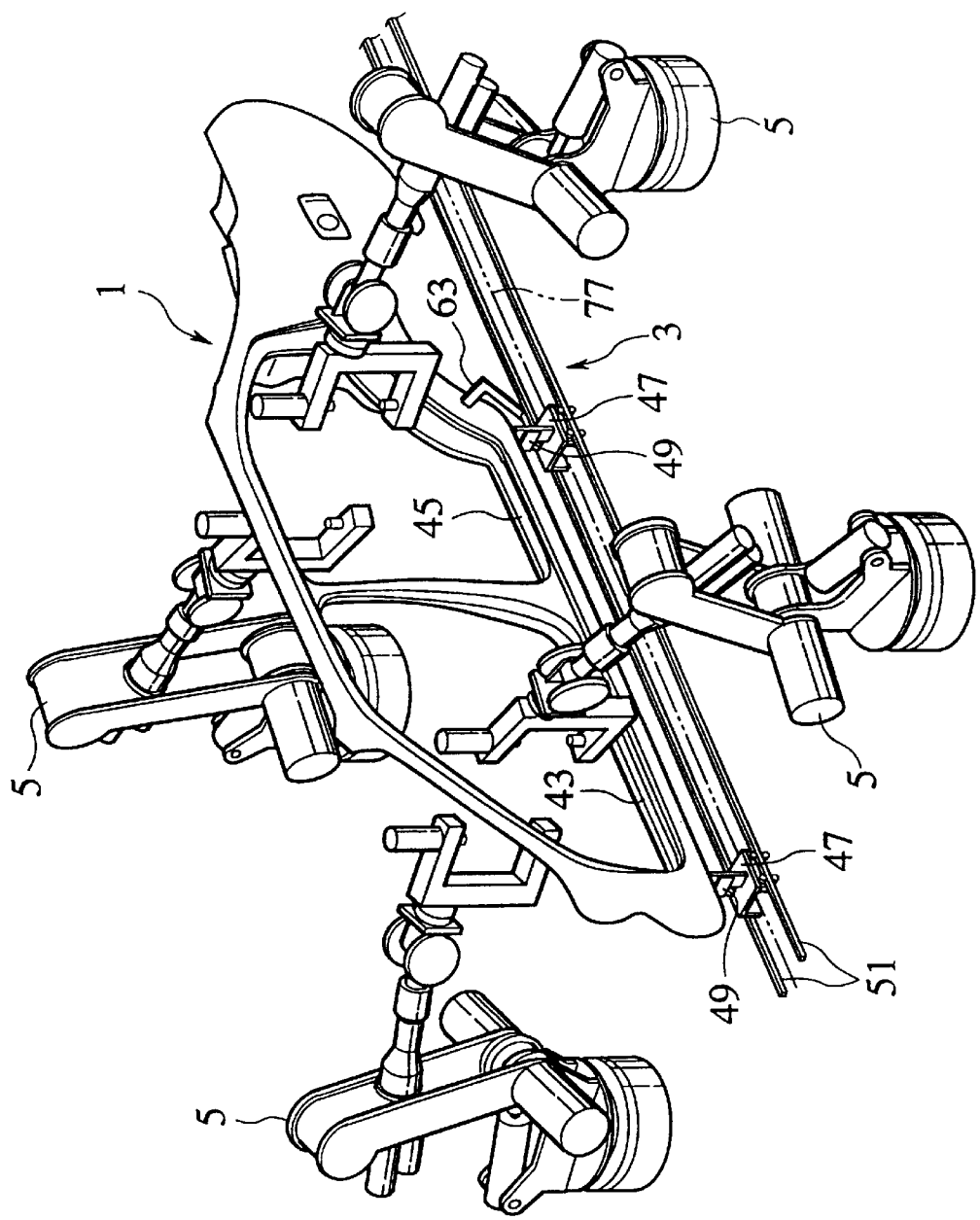
FIG. 4 is a perspective view which shows a part of the body side transfer apparatus.

In a fourth stage S, which corresponds to FIG. 4, the inner parts 13 and 15 temporarily welded in the third stage R and the body side outer 7 are additionally welded by a plurality of welding robots 5 disposed in both sides of the transfer apparatus 3, and in this stage, all the welding operation is completed so that a body side outer 1 can be obtained.

Figure 7:
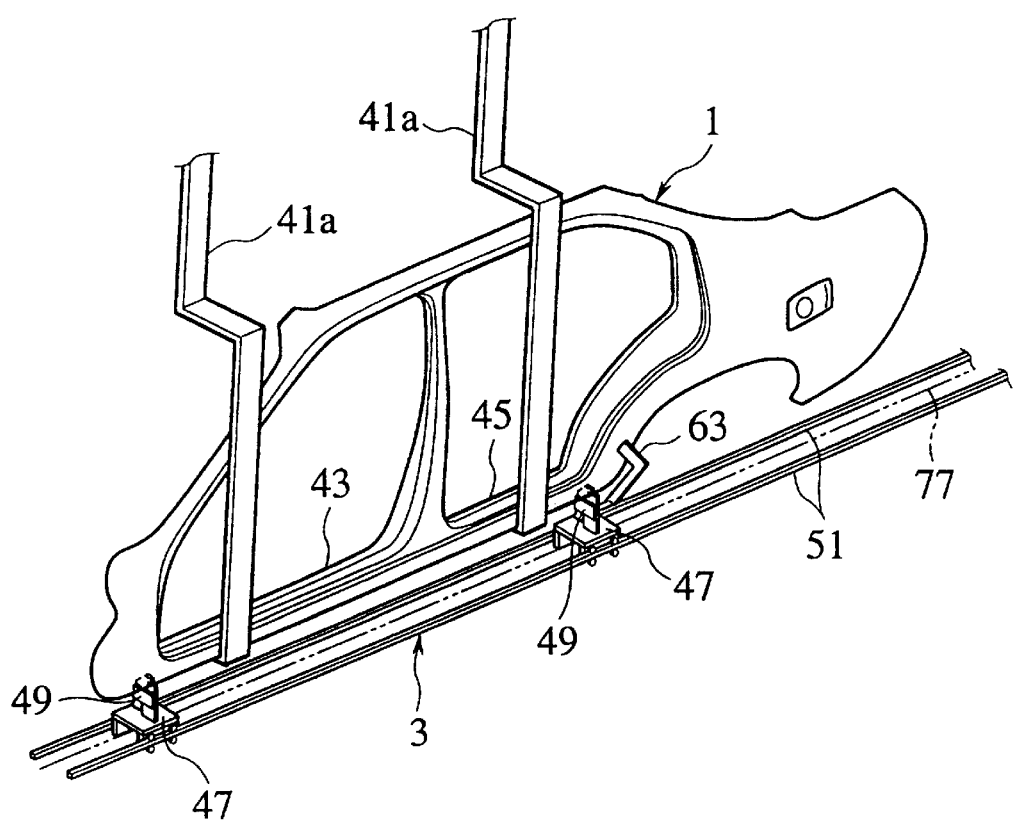
FIG. 7 is a perspective view showing a state of carrying out the body side obtained by completion of the welding operation in the assembling apparatus shown in FIG. 4.

In a fifth stage T, the body side 1 obtained in the fourth stage S is hung up by a lifter 41, and is transferred to the following stage of the assembly line. The lifter 41 is constructed by a drop lifter in which two supporting arms 41a are hung down from an over head conveyor (not shown) so as to be capable of ascending and descending, as shown in FIG. 7, and is structured such as to hang up and carry out the body side 1 by a hook portion at a lower end of the supporting arm 41a.

Figure 5:
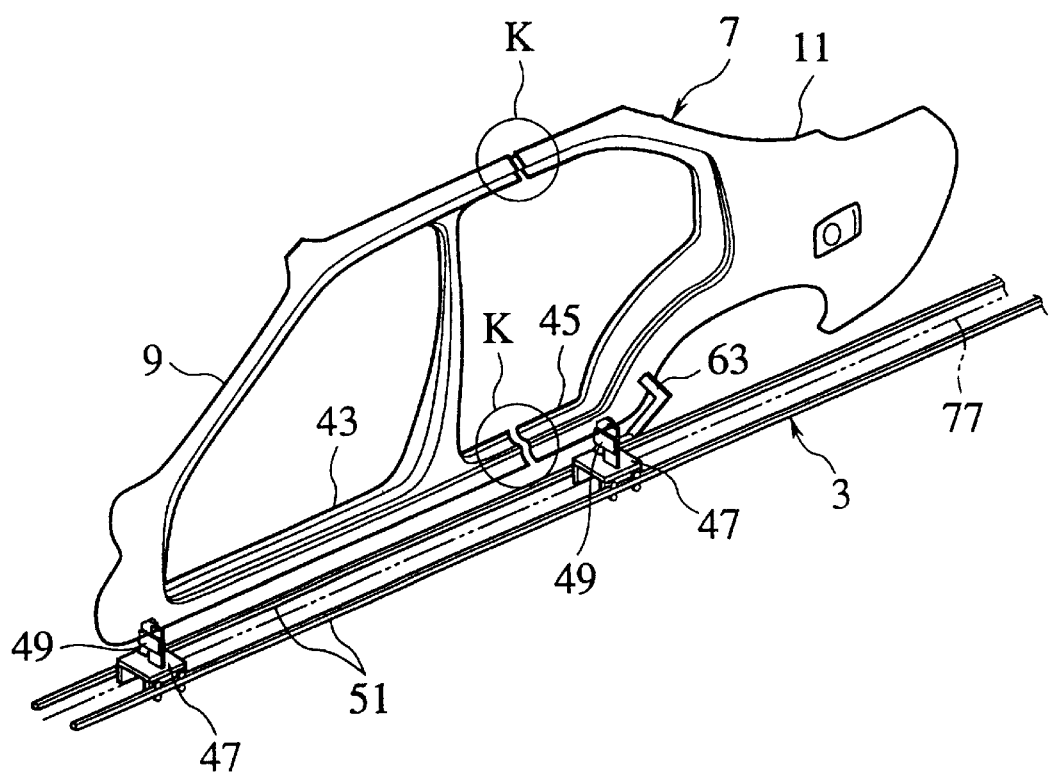
FIG. 5 is a perspective view showing a state in which a front and rear parts are set on a transfer line of an assembling apparatus shown in FIG. 4.

As shown in FIGS. 5 and 6, the work on the transfer apparatus 3 mentioned above is transferred in an upright position each that the lower ends of side sills 43 and 45, disposed at the respective lower ends of the front part 9 and the rear fender part 11, are positioned and fixed by a clamp member 49 provided on a moving body 47. The moving body 47 moves along a pair of guide rails 51 extending toward the transfer direction together with the clamp member 49.

Figure 8:
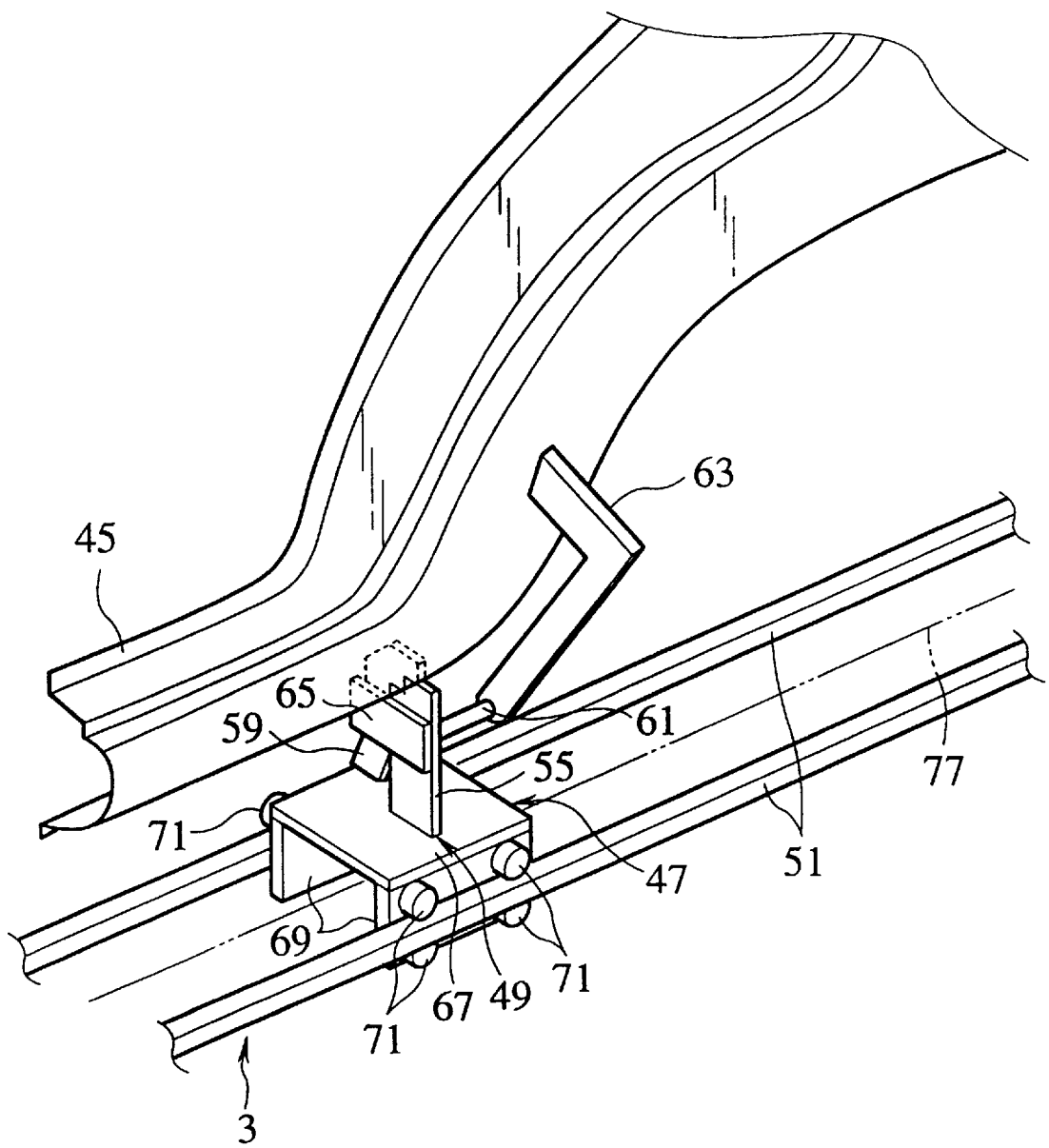
FIG. 8 is a perspective view showing a detail of a portion in which the work is clamped and transferred in the assembling apparatus shown in FIG. 4.
Figure 9:
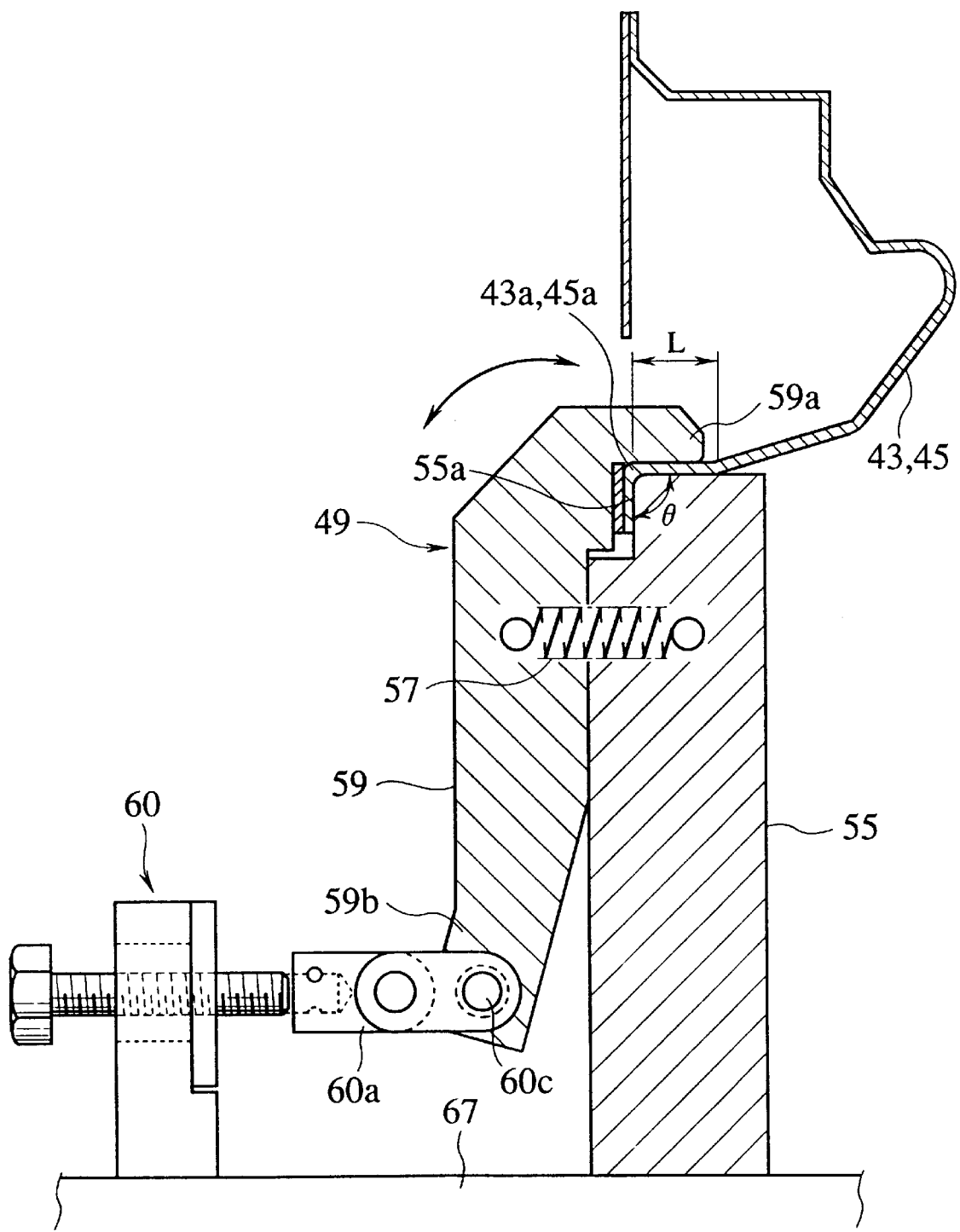
FIG. 9 is a cross sectional view which shows a detail of the clamp member shown in FIG. 8.

As shown in FIG. 8 which corresponds to an enlarged perspective view of the fixed part at the rear end in FIG. 4 to FIG. 7, the clamp member 49 is provided with a fixed plate 55 a lower end of which is fixed to the moving body 47, and a movable plate 59 connected to the fixed plate 55 by a spring 57 (shown in FIG. 9 which corresponds to a cross sectional view of FIG. 8) and urged to the fixed plate 55 so as to maintain the state of FIG. 9. A hook portion 59a and a recess portion 55a are respectively formed on the upper end of the movable plate 59 and the upper end of the fixed plate 55, and a bent portion 45a (43a) at the lower end of the side sill 45 (43) is held and fixed between the hook portion 59a and the recess portion 55a.

The shape of the bent portion 45a (43a) of the side sill 45 (43) is set to be the same shape without relation to the kinds of cars. Concretely speaking, an angle θ and a length L in the width direction of the vehicle of the bent portion are common to the respective cars. The lower portion of the movable plate 59 is bent to the direction apart from the fixed plate 55 so as to form an operating portion 59b, and the operating portion 59b is pressed by an operating rod 60a of a pressing mechanism 60 against the spring 57 through a pin 60c from a state shown in FIG. 9. The pressing mechanism 60 is provided in a horizontal plate 67 constituting the moving body 47 as shown in the drawing, however, it may be provided outward the transfer apparatus 3 so that the clamp member 49 is operated to be opened or closed from the outer portion.

As shown in FIG. 8, a work support device 63 is attached to a side portion of the fixed plate 55 through a supporting shaft 61. The work support device 63 prevents the front part 9 and the rear fender part 11 from falling in a state of inclining the respective parts 9 and 11 to the side opposite to the inner parts mounting end rather than a state of clamping the respective parts 9 and 11 by the clamp member 49 at a time of setting the front part 9 and the rear fender part 11 on the transfer apparatus 3 in the first stage P. The clamp member 49 is stood up to a normal upright position (a clamp position) apart from the work support device 63 by a servo motor (not shown) disposed outward the transfer apparatus 3, and then clamps the work. A guide plate 65 is fixed to the both side portions of the fixed plate 55 and guides the movable plate 59.

In FIG. 8, the work support device 63 is provided only in the side of rear fender part 11 which is heavier than the front part 9, however, if it is necessary, in addition to the rear fender part 11 end, the work support device 63 may be provided in the side of the front part 9.

Figure 10:
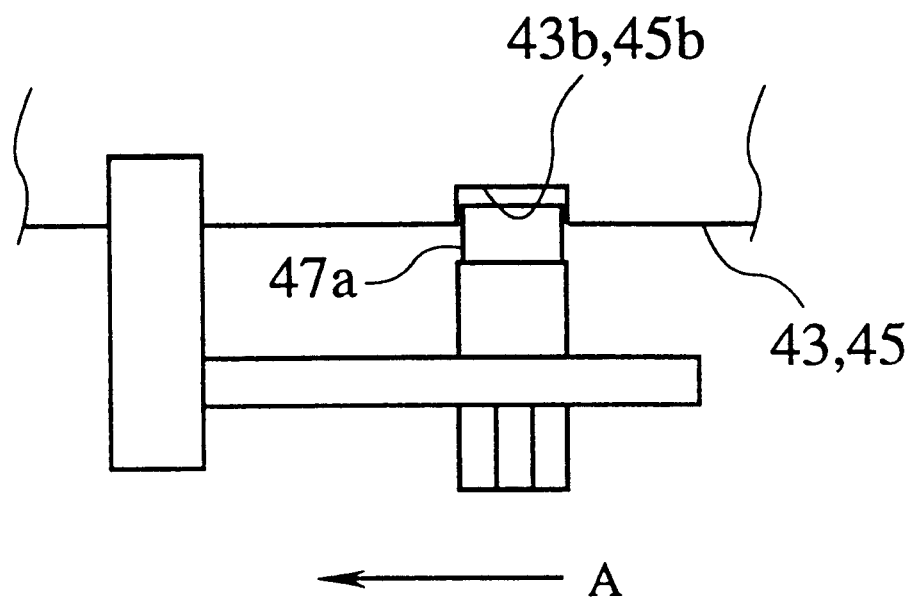
FIG. 10 is a view which shows a positioning mechanism for positioning the work in the transfer direction in the assembling apparatus shown in FIG. 4.

The clamp member 49 mentioned above respectively positions the work in the lateral direction and the vertical direction perpendicular to the transfer direction A of the work. As shown in FIG. 10, the positioning in the transfer direction is performed by forming a notch 45b (43b) on the lower end of the side sill 45 (43) and inserting a positioning projection 47a provided in the moving body 47 into the lower end of the notch 45b (43b).

The moving body 47 moving on the guide rail 51 is constituted by the horizontal plate 67, a side plate 69 an upper end of which is fixed to the lower portion of both ends in the lateral direction facing the transfer direction of the horizontal plate 67, and a cam follower 71 comprising a roller rotatably mounted to the outer portion of the side plate 69. Two cam followers 71 are respectively mounted to the front portion and the rear portion of each of the side plates 69 in such a manner as to hold the guide rail 51 therebetween.

Figure 11:
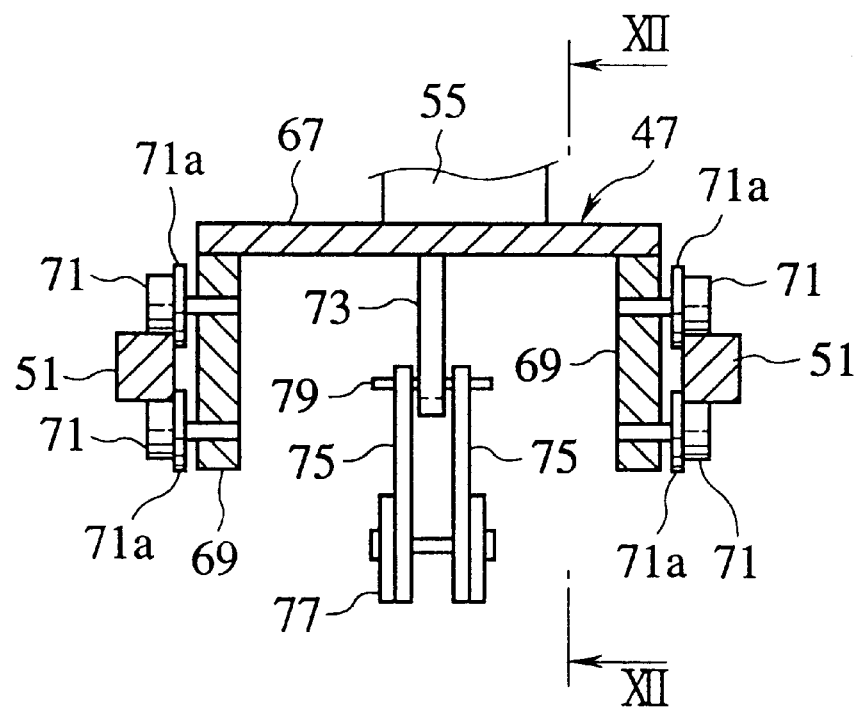
FIG. 11 is a cross sectional view along a perpendicular line with respect to the transfer direction of the moving body shown in FIG. 8.

FIG. 11 is a cross sectional view along a perpendicular line with respect to the transfer direction of the moving body 47 in the portion in which the cam follower 71 is mounted. A flange 71a is formed on the inner end portion of each of the cam followers 71, and the displacement of the moving body 47 in the lateral direction and the vertical direction in FIG. 11 are both restricted by positioning the flange 71a to the inner portion of the guide rail 51.

Figure 12:
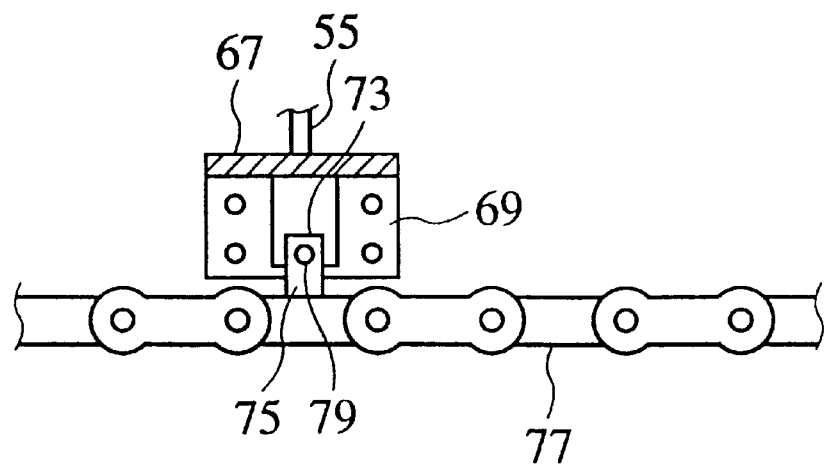
FIG. 12 is a cross sectional view along a line XII—XII in FIG. 11.

An upper end of a chain mounting portion 73 is fixed to the lower surface of the horizontal plate 67 in the moving body 47, and a chain 77 is attached to the lower end of the chain mounting portion 73 through an attachment 75 as shown in FIG. 12 which corresponds to a cross sectional view along a line XII—XII of FIG. 11. The chain mounting portion 73 and the attachment 75 can be rotated around a pin 79.

Figure 13:
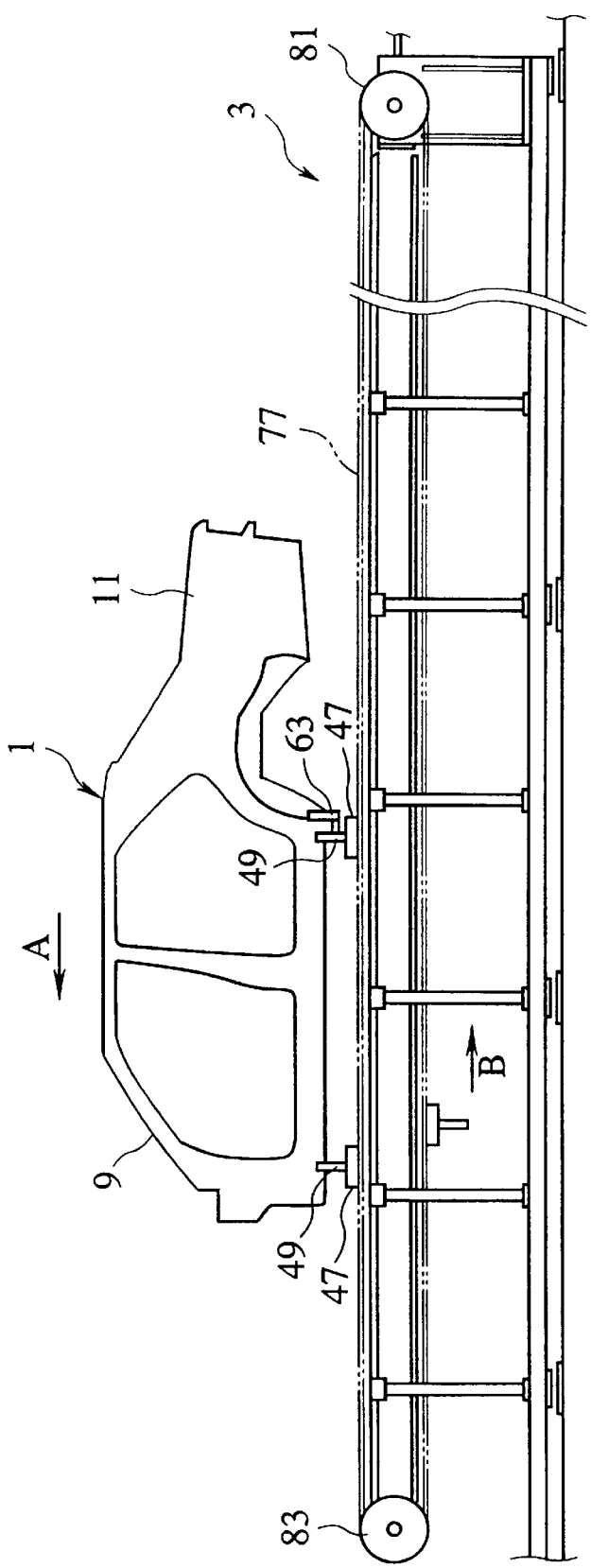
FIG. 13 is a plan view which shows a total structure of the transfer apparatus in the assembling apparatus shown in FIG. 4.

The transfer apparatus 3 constituted by the chain 77, the moving body 47 and the guide rail 51 moves to the direction shown by an arrow A in the drawing by winding the chain 77 between sprockets 81 and 83 at both ends, as shown in FIG. 13 which corresponds to a side elevational view of the total structure.

Next, an operation of the transfer apparatus for transferring the body side of the automotive vehicle will be described below. In the first stage P of the process drawing in FIG. 3, the front part 9 and the rear fender part 11 are set on the transfer apparatus 3 by the work setting robot 16 in a state of placing the connecting portions K opposite.

At this time, the clamp member 49 is in a state such that the operating portion 59b of the movable plate 59 is pressed and the clamp portion is released. Accordingly, the set parts 9 and 11 are inserted into the clamp portion in the released state in the lower end of the side sills 43 and 45. Further, as shown in FIG. 10, the positioning in the transfer direction is performed by inserting a positioning projection 47a into the notches 43b and 45b at the lower end of the side sills 43 and 45. In this state, the respective parts 9 and 11 are inclined to this end with respect to the paper surface of FIG. 5 rather than the upright position at a time of normal welding operation, and the inclined state is held by the work support device 63 supporting the rear fender part 11. As to the front part 9, since it is lighter than the rear fender part 11, it is supported by the rear fender part 11 in the connecting portion K.

When the respective parts 9 and 11 held by the work support device 63 are pressed from this end with respect to the paper surface of FIG. 2 by the servo motor (not shown) and the like so as to be stood up, and the pressing operation with respect to the operating portion 59b in the clamp member 49 is removed, the bent portion 43a and 45a of the lower end of the side sills 43 and 45 are held and fixed therebetween as shown in FIG. 9. Accordingly, the respective parts 9 and 11 can be positioned in the lateral direction and the vertical direction with respect to the transfer direction. After positioning, the connecting portion K between the respective parts 9 and 11 is joined by welding by means of the welding robot 17 so as to obtain the body side outer 7.

When the first stage P is completed, the transfer apparatus 3 is driven so as to move the chain 77 to the direction of the arrow A in FIG. 13. Then, the body side outer 7 is transferred to the same direction together with the moving body 47 so as to be moved to the second stage Q. In the second stage Q, the additional welding operation is given to the body side outer 7 obtained in the first stage P by the welding robot 21 disposed in both sides of the transfer apparatus 3.

After the second stage Q is completed, the transfer apparatus 3 is driven in the same manner as that mentioned above so as to move the body side outer 7 to the third stage R.

After the third stage R is completed, the body side outer 7 to which the inner parts 13 and 15 are temporarily welded is further moved to the fourth stage S by driving the transfer apparatus 3.

In the following fifth stage T, the body side 1 obtained in the fourth stage S is transferred by driving the transfer apparatus 3, and the transferred body side 1 is hung up by the supporting arm 41a of the lifter 41, as shown in FIG. 7, so as to be carried out to the following stage.

Figure 14:
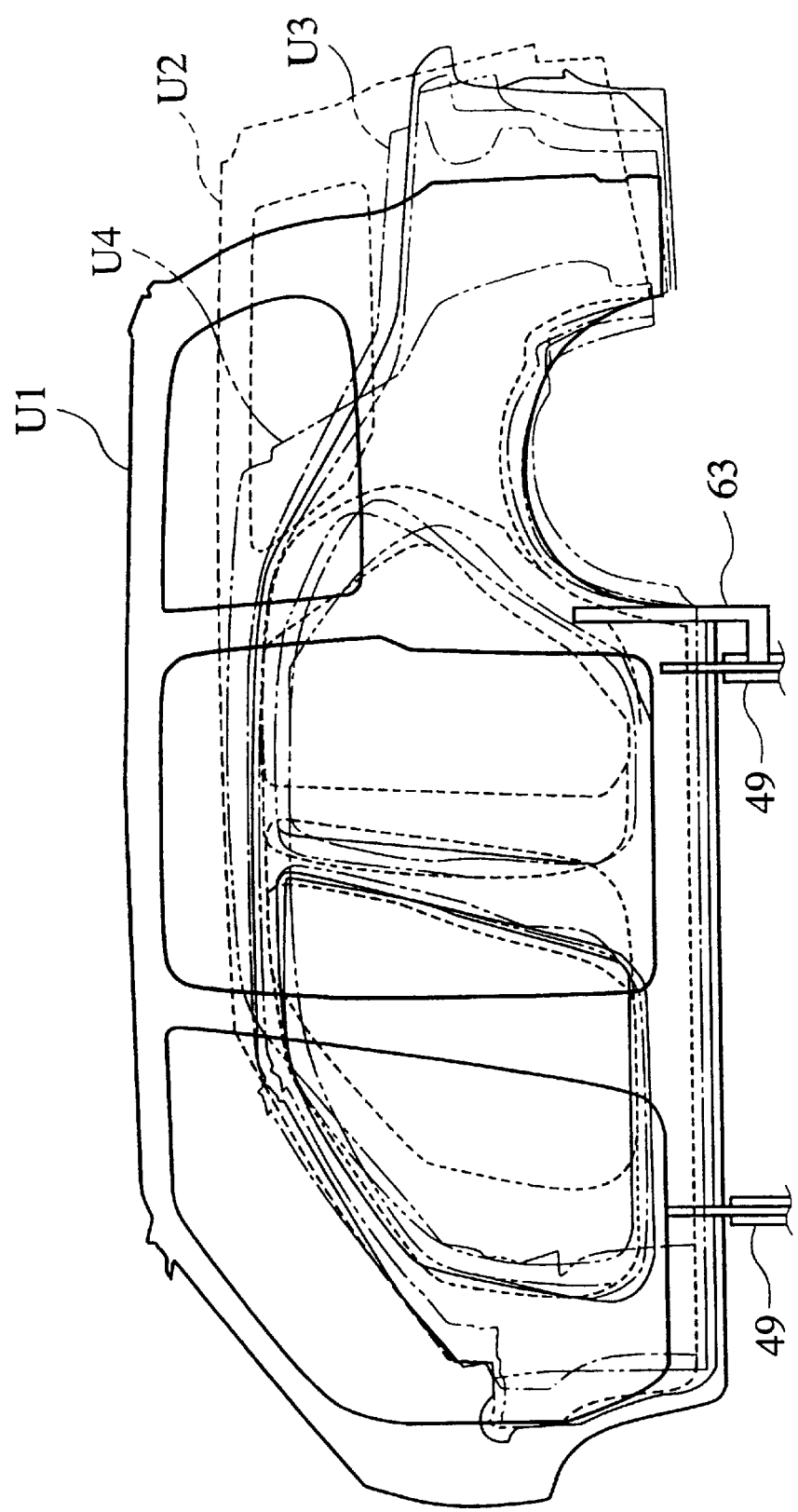
FIG. 14 is a schematic view which shows a clamping operation by means of the clamp member in the assembling apparatus shown in FIG. 4 with respect to a plurality kinds of cars.

In the side sills 43 and 45, as shown in FIG. 9, since an angle θ at the bent portions 43a and 45a in the lower end and a length L in the width direction of the vehicle is set to be the same without relation to the kinds of cars, the clamp member 49 can clamp a plurality of different kinds of cars U1, U2, U3 and U4 in an upright position as shown in FIG. 14, so that the exclusive jig is not necessary for each of the cars and the clamp member 49 can be made simple. Further, since the conveyor using an inexpensive chain 77 is used as the transfer apparatus 3 used for transferring the work, it is possible to largely reduce the provision cost.

Figure 2A:
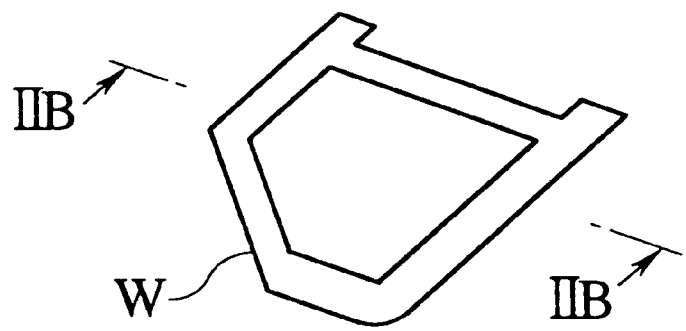
FIG. 2A is a view showing a part to be worked which is set on the body side transfer apparatus shown in FIG. 1.
Figure 2B:
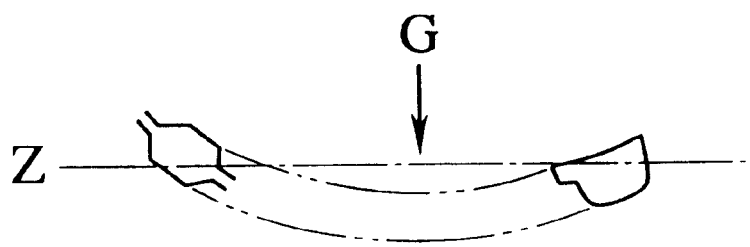
FIG. 2B is a cross sectional view along a line IIB—IIB in FIG. 2A which shows an example of the part to be worked shown in FIG. 2A in a bending state.
Figure 15A:
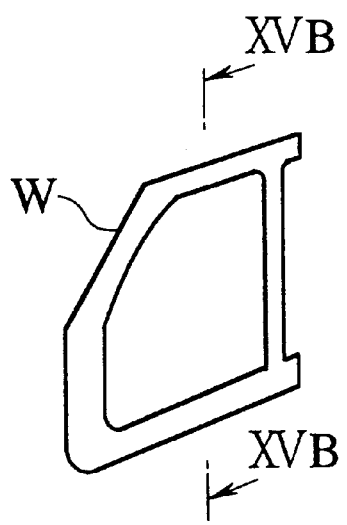
FIG. 15A is a schematic view of a work in an upright position.
Figure 15B:
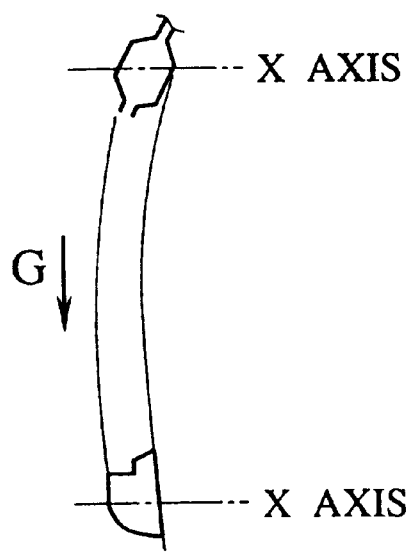
FIG. 15B is a cross sectional view along a line XVB—XVB shown in FIG. 15A which shows a slack operation due to the own weight in a state of FIG. 15A.

FIGS. 15A and 15B show a slack due to its own weight of the work W when the work W corresponding to the front part of the body side outer is in an upright position applied to the present invention, and FIG. 15B is a schematic cross sectional view along a line XVB—XVB shown in FIG. 15A showing the work attitude. On the contrary, FIGS. 2A and 2B show a slack due to its own weight of the work W when the work W is in a laying down state which is applied to the embodiment of the related art, and FIG. 2B is a schematic cross sectional view along a line IIB—IIB shown in FIG. 2A showing the work attitude.

In the case of FIGS. 15A and 15B in which the work is stood up, a cross sectional secondary moment around an X axis is large and a bending rigidity becomes large so that the slack deformation due to the gravity G becomes small. On the contrary, in FIGS. 2A and 2B in which the work is laid down, a cross sectional secondary moment around a Z axis is small and the bending rigidity becomes small so that the slack deformation due to the gravity becomes large.

As mentioned above, in accordance with the present invention, since the work is transferred and welded in a state that the work is stood up corresponding to the state that bending rigidity of the work cross section becomes maximum with respect to the operating direction of its own weight of the work, the work is hard to be deformed in comparison with the state that the work is laid down, so that the accuracy is improved. Further, since the work is in the upright position, the space for operating can be reduced.

In carrying out the body side 1 in the final fifth stage T, since the conventional apparatus for standing up the body side from the laying down state is not required, the provision cost can be reduced.

Figure 16:
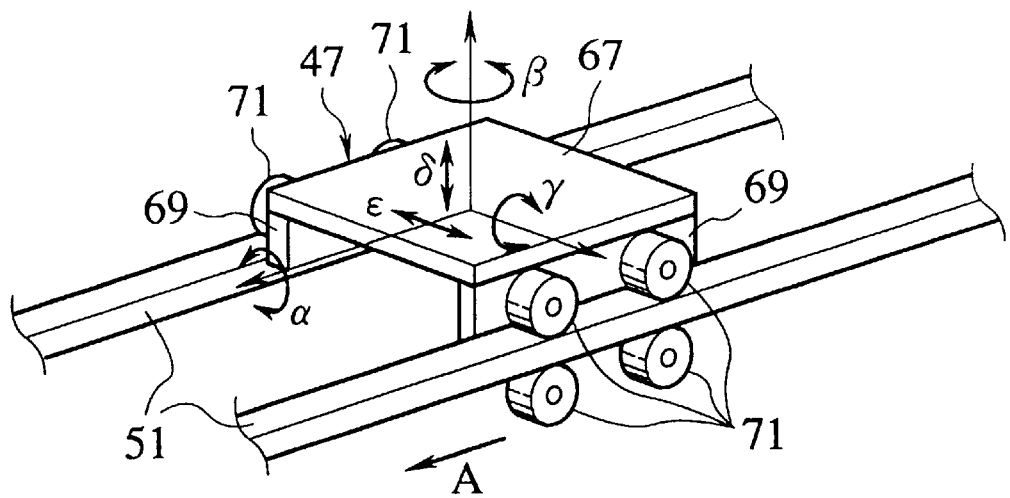
FIG. 16 is a schematic view which shows a displacement operation of the moving body shown in FIG. 8.

In the transferring apparatus 3, since eight cam followers 71 mounted to the moving body 47 are disposed in such a manner as to hold the upper and lower portions of the guide rail 51 and restrict the lateral displacement by the flange 71a as shown in FIG. 11, the displacement α around the axis in the transfer direction A, the displacement β around the axis in the vertical direction, the displacement γ around the axis in the lateral direction perpendicular to the transfer direction A, the displacement δ in the vertical direction and the displacement ε in the lateral direction with respect to the transfer direction A are all restricted as shown in FIG. 16, so that the vibration and the motion in the zigzag direction of the work during transferring can be securely prevented. Further, at a time of welding, since the positioning accuracy is improved, the welding with a high accuracy can be performed.

Further, since the load of the work is received by the guide rail 51 through the horizontal plate 67, the side plate 69 and the cam follower 71 of the moving body 47 from the fixed plate 55 of the clamp member 49, as shown in FIG. 11 and does not affect to the chain 77, the chain 77 is prevented from extending so as to achieve the vibration prevention and the long life. Still further, the inexpensive chain can be used for this chain, thereby achieving the cost reduction.

Since the chain 77 is structured such as to be hung by the moving body 47, thereby preventing the hanging down, the guide shoe or the sprocket for holding the chain is not required, and the impact due to the slack of the chain at a time of starting or stopping can be prevented.

Figure 17:
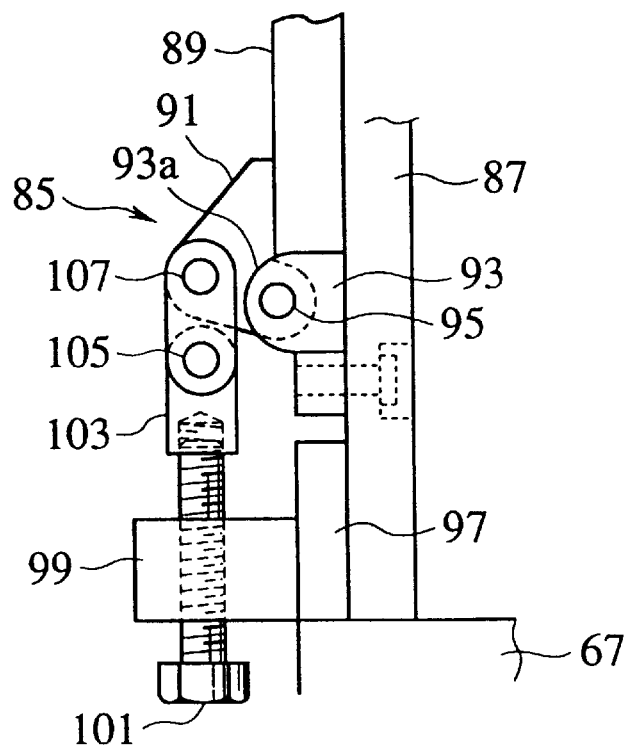
FIG. 17 is a cross sectional view which shows another embodiment of the clamp member shown in FIG. 9.

FIG. 17 shows another embodiment of the clamp member shown in FIG. 9. A clamp member 85 is provided with a fixed plate 87 provided on the moving body 47 shown in FIG. 8 and a rotating plate 91 for holding and fixing a flange 89 of the work corresponding to the lower end of the side sills 43 and 45 of the front part 9 or the rear fender part 11 with respect to the fixed plate 87. The lower end of the flange 89 is positioned by being brought into contact with an upper end of a positioning plate 93 provided on the side of the fixed plate 87 in the vertical direction. A rotation supporting flange 93a is formed on the positioning plate 93, and the rotating plate 91 is rotatably supported to the rotation supporting flange 93a through a rotation supporting pin 95.

On the contrary, in the lower portion of the rotating plate 91, a nut 99 is fixed to the side portion of the lower end of the fixed plate 87 through a middle member 97, and a connecting member 103 is fixed to a front end of a screw 101 screwed to the nut 99 from the downward portion. The upper end of the connecting member 103 and the rotating plate 91 are rotatably connected to each other through connecting pins 105 and 107.

In the structure shown in FIG. 17, since the screw 101 is screwed upward with respect to the nut 99, the rotating plate 91 rotates in the clockwise direction in the drawing around the rotation supporting pin 95 so as to hold and fix the flange 89 with respect to the fixed plate 87, thereby positioning in the lateral direction and the vertical direction with respect to the transfer direction of the work.

Figure 18:
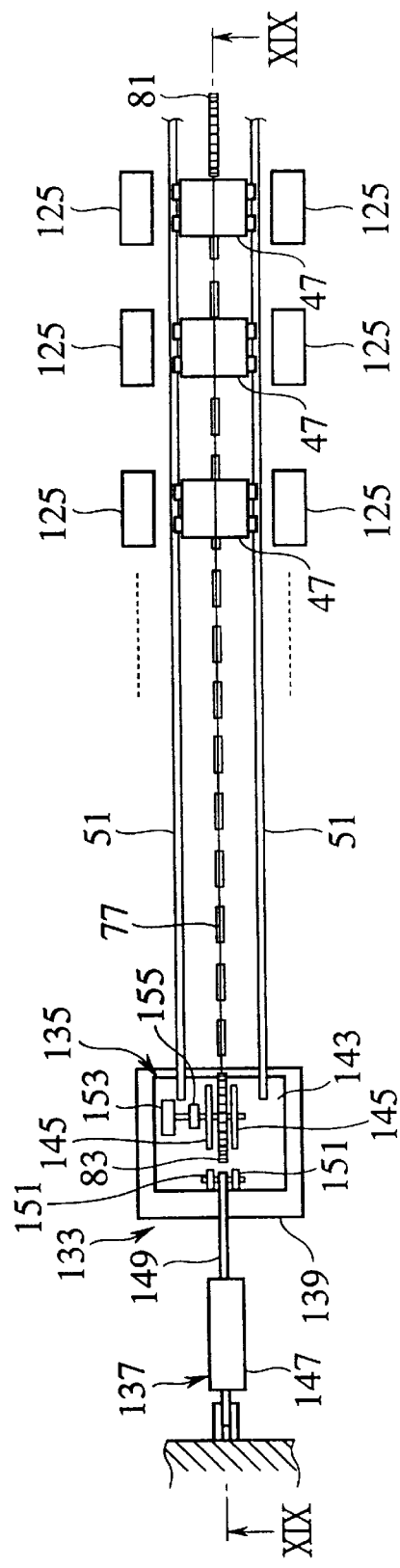
FIG. 18 is a schematic plan view which shows a total structure of a chain conveyor provided with a work positioning apparatus in accordance with an embodiment of the present invention.
Figure 19:
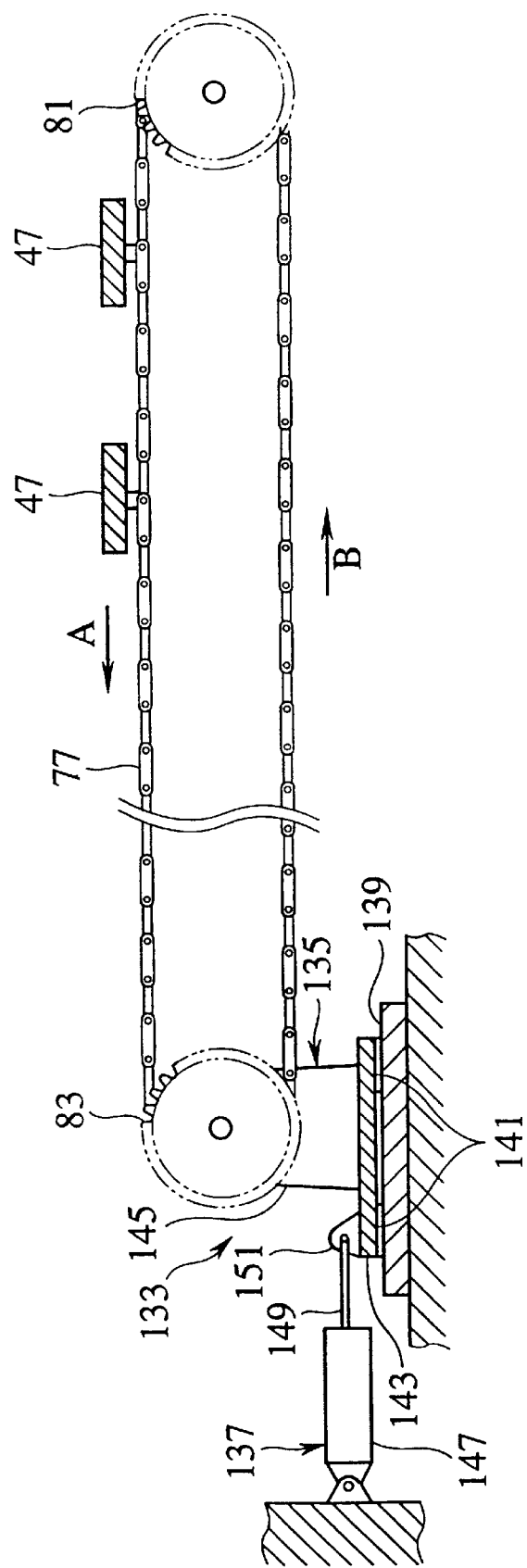
FIG. 19 is a plan view of the chain conveyor shown in FIG. 18.

FIG. 18 is a schematic plan view which shows a total structure of a chain conveyor provided with a work positioning apparatus in accordance with an embodiment of the present invention and FIG. 19 is a plan view of the chain conveyor shown in FIG. 18. The chain 77 is structured in such a manner as to be wound between the drive sprocket 83 disposed at the left end portion of the drawing and the driven sprocket 81 disposed at the right end portion of the drawing so as to move in the direction shown by arrow A in FIG. 2. A plurality of moving bodies 47 serving as the work holding and transferring member are mounted on the chain 77.

As shown in FIG. 11 which is a cross sectional view along a line perpendicular to the transfer direction in FIG. 8, the cam follower 71 comprising four rollers is mounted to each of the right and left side plates 69 provided in both side portions of the horizontal plate 67 for holding the guide rail 51 in the vertical direction.

As shown in FIG. 11, the upper end of the chain mounting portion 73 is fixed to the lower surface of the horizontal plate 67, and as shown in FIG. 12, the chain 77 is attached to the lower end of the chain mounting portion 73 through the attachment 75. The chain mounting portion 73 and the attachment 75 can be rotated by the pin 79.

Figure 20A:
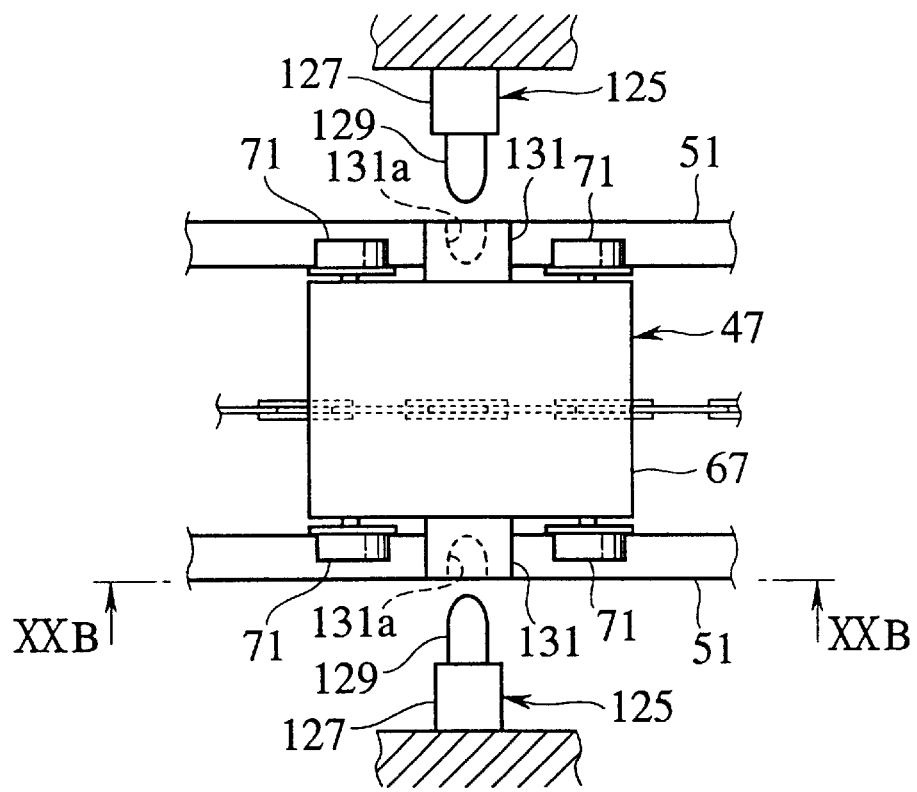
FIG. 20A is a plan view which shows a positioning mechanism with respect to the moving body in FIG. 8.
Figure 20B:
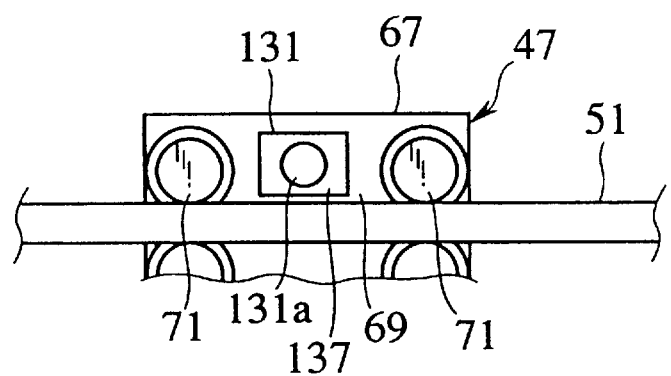
FIG. 20B is a view as seen from a line XXB of FIG. 20A.
Figure 21:
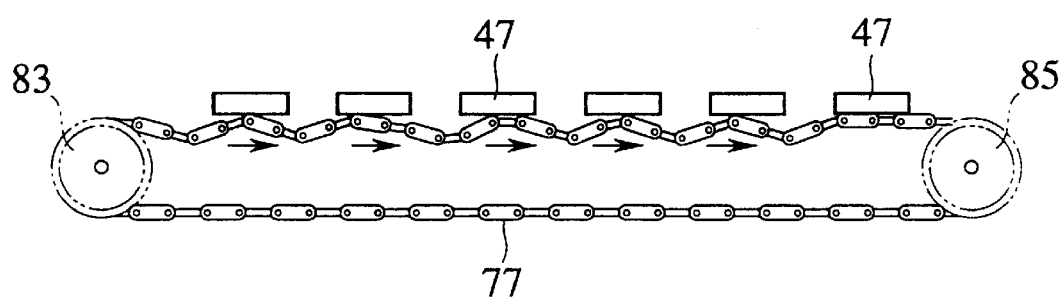
FIG. 21 is a schematic view which shows a positioning operation in the chain conveyor shown in FIG. 18.

As shown in FIG. 18, a positioning member 125 for positioning the moving body 47 is provided in both sides of the guide rail 51. The positioning member 125 is structured in such a manner as to position the moving body 47 in a state that the work W held by the moving body 47 is in a predetermined operating position, and the details are shown in FIG. 20A. FIG. 20A is a plan view and FIG. 20B is a view as seen from a line XXB of FIG. 20A.

The positioning member 125 is provided with an air cylinder 127 as a driving means, and a taper pin 129 moves to the moving body 47 by driving the air cylinder 127. On the contrary, a projecting portion 131 is formed between the cam followers 71 disposed upward the guide rail 51 of the side plate 69 in the moving body 47, a taper hole portion 131a is formed on the end surface of the projecting portion 131, and the positioning is performed by inserting the taper pin 129 in the positioning member 125 end into the taper hole portion 131a. The positioning member 125 and the taper hole portion 131 constitute a positioning mechanism.

The drive sprocket 83, as shown in FIG. 19, around which the chain 77 is wound is connected to a tension generating mechanism 133, and the tension generating mechanism 133 applies and removes the tension with respect to the chain 77. The tension generating mechanism 133 is provided with a slide portion 135 to which the drive sprocket 83 is mounted and an oil hydraulic cylinder 137 for generating a tension in order to slide the slide portion 135 to the lateral direction of FIG. 19.

The slide portion 135 is structured in such a manner as to slide on a base 139 through a linear guide rail 141, and is provided with a bottom plate 143 and a pair of mounting plates 145 fixed on the bottom plate 143 in a lower end and having an upper end to which the drive sprocket 83 is rotatably mounted. On the contrary, in the oil hydraulic cylinder 137, the front end of a rod 149 projecting from a cylinder body 147 is fixed to a mounting bracket 151 fixed to the bottom plate 143, and the tension is applied to and removed from the chain 77 by moving the slide portion 135 together with the operation of the oil hydraulic cylinder 137.

Further, as shown in FIG. 18, a motor 153 for driving the drive sprocket 83 is provided on the bottom plate 143, and a clutch mechanism 155 for transmitting and intercepting the power of the motor 153 to the drive sprocket 83 is provided between the motor 153 and the drive sprocket 83.

Next, the operation of the work positioning apparatus mentioned above will be described below. The work W to be processed is fixed and held on the moving body 47 and is transferred by driving the chain 77. At this time, the tension is applied to the chain 77 by the tension generating mechanism 133. Accordingly, the rod 149 of the oil hydraulic cylinder 137 for generating a tension is pulled into the cylinder body 147 so that the slide portion 135 slides in the left direction in FIGS. 18 and 19.

When the work W to be processed is transferred to a predetermined operating position by driving the chain 77, the moving body 47 at this position (in this case, the moving body 47 of the driven sprocket 81 end in FIG. 18) is detected by, for example, a sensor (not shown) so as to stop the motor 153 and then stop driving the chain 77. At the stopping time, each of the moving bodies 47 of the drive sprocket 83 end with respect to the moving body 47 detected by the sensor stops at a position in which the moving body overruns forward the set positioning position in the transferring direction in correspondence to the extension amount of the chain 77.

In this state, the rod 149 of the oil hydraulic cylinder 137 is advanced so as to move the slide portion 135 to the right direction in FIGS. 18 and 19 and to remove the tension on the chain 77, thereby giving a slack to the chain 77. At the same time, the clutch mechanism 155 intercepts the power transmission between the motor 153 and the drive sprocket 83, thereby making the drive sprocket 83 free. In this state, the air cylinder 127 in the positioning member 125 shown in FIG. 20 is driven so as to project the taper pin 129 and insert the taper pin 129 into the taper hole 131a of the moving body 47 end, thereby positioning and fixing the moving body 47 from both sides thereof.

Since the moving body 47 holding the work W is positioned and fixed at a predetermined operating position with respect to the work W, even when the total length of the chain 77 is changed due to the abrasion of the pin or the temperature change, positioning in a predetermined operating position can be accurately performed, so that the operation by the robot disposed in the side of the chain conveyor, for example, the welding operation with respect to the body side as shown in FIG. 4 can be performed with a high accuracy.

Further, since the moving body 47 is held and fixed in both sides thereof by fitting between the taper pin 129 and the taper hole portion 131a, the work W is hard to generate a vibration at a time of being welded, so that the welding operation can be performed with higher accuracy. Still further, during the welding operation, the moving body 47 is fixed by the positioning mechanism in the above manner and is supported by the guide rail 51, no load is applied to the chain 77, so that the long life of the chain 77 can be achieved.

As shown in FIG. 18, in the case that a plurality of moving bodies 47 are provided and the works W on the respective moving bodies 47 are positioned to the predetermined operating positions at a time of stop of the chain 77, as shown in the schematic drawing of FIG. 8, the positioning is successively performed from the moving body 47 disposed at the end portion (in this case, the end portion of the driven sprocket 81 end) toward the moving body 47 disposed at the drive sprocket 83. As mentioned above, since the moving bodies 47 are successively positioned from the end portion of the chain 77, the extension of the chain 77 is successively drawn in. In addition that the drive sprocket 83 is made free, this makes the troubles due to the tension of the chain 77 free so that the positioning operation can be securely performed.

Further, with respect to the plurality of moving bodies 47, only the operating stage which is necessary to be positioned can be positioned in accordance with necessity, thereby being applicable to diversification of the transfer line. Further, the moving body 47 is hardly displaced in the vertical direction because the moving body 47 is supported to the guide rail 51, so that the positioning operation is easily performed because it is only to the transfer direction due to the extension of the chain 77.

In this case, the moving body 47 may be structured in such a manner as to be directly supported by the chain 77 in place of being supported by the guide rail 51 mentioned above.

Figure 22A:
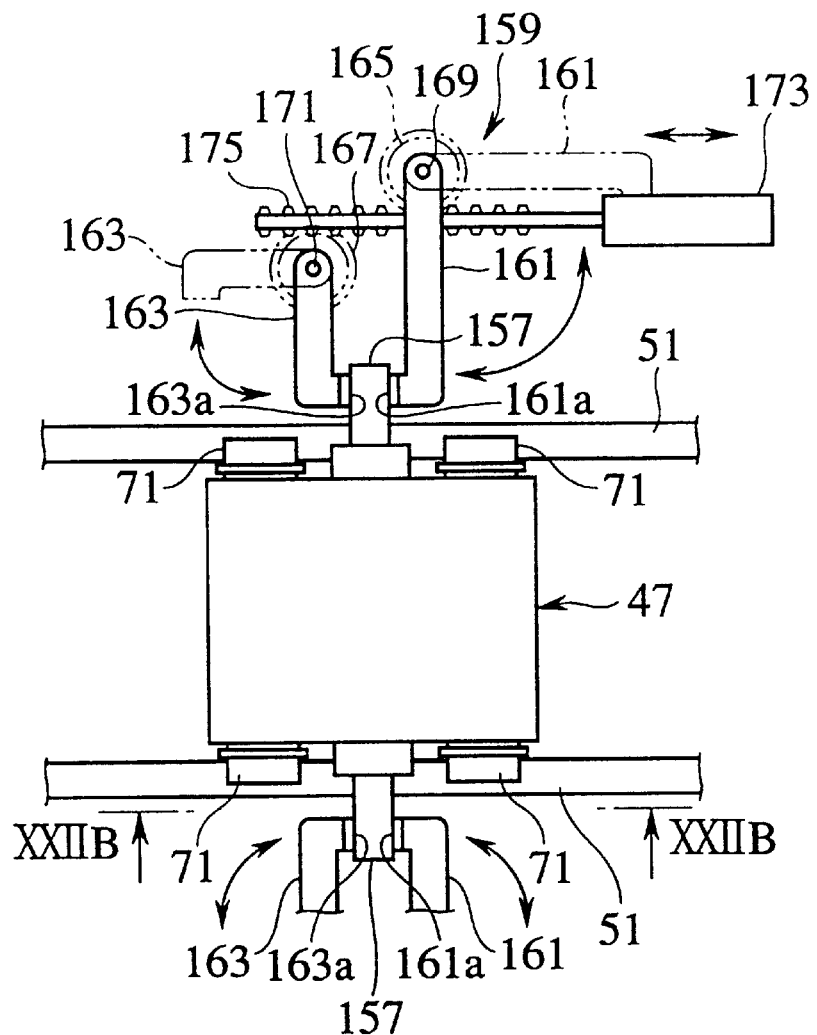
FIG. 22A is a plan view which shows another embodiment of the positioning mechanism.
Figure 22B:
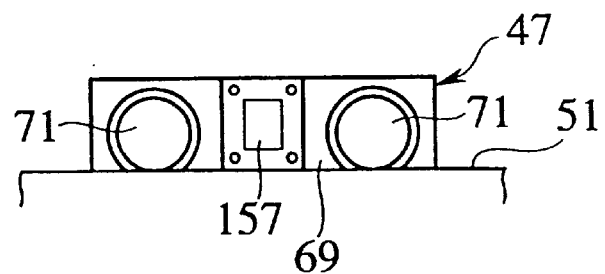
FIG. 22B is a view as seen from a line XXIIB of FIG. 22A.

FIG. 22A shows another embodiment of the positioning mechanism with respect to the moving body 47. FIG. 22A is a plan view and FIG. 22B is a cross sectional view as seen from a line XXII—XXII of FIG. 22A. In this embodiment, a rod 157 serving as a rectangular held portion is projected and fixed to the side plate 69 of the moving body 47, and the rod 157 is held and fixed by a holding arm mechanism 159 disposed in the side of the guide rail 51 so as to position and fix the moving body 47. The holding arm mechanism 159 and the rod 157 constitute a positioning mechanism.

The holding arm mechanism 159 holds and fixes the rod 157 by respective fixing portions 161a and 163a of a long arm 161 and a short arm 163, and pinions 165 and 167 are respectively fixed to the base ends of the respective arms 161 and 163 through fixing pins 169 and 171. The fixing pins 169 and 171 are rotatably supported to a rotation supporting portion (not shown) in the outward portion, and rotatably support the pinions 165 and 167 and the arms 161 and 163 respectively with respect to the rotation supporting portion. A rack 175 which can move in the lateral direction in the drawing by an air cylinder 173, is provided with a tooth portion on both side portions in the vertical direction, and is meshed with the respective pinions 165 and 167 and is disposed between the respective pinions 165 and 167.

Since the rack 175 moves from the state shown in FIG. 22 to the right direction by the operation of the air cylinder 173, the pinion 165 rotates in the counterclockwise direction in the drawing, and on the contrary, the pinion 167 rotates in the clockwise direction. Together with this rotation, the respective arms 161 and 163 are rotated to the direction apart from each other so as to be positioned in the position shown by a two-dot chain line in FIG. 22. In contrast with this, when the rack 175 moves to the left direction in the drawing, the rod 157 is held and fixed by the respective arms 161 and 163, so that the moving body 47 is positioned at a predetermined operating position in the transfer direction.

Figure 23:
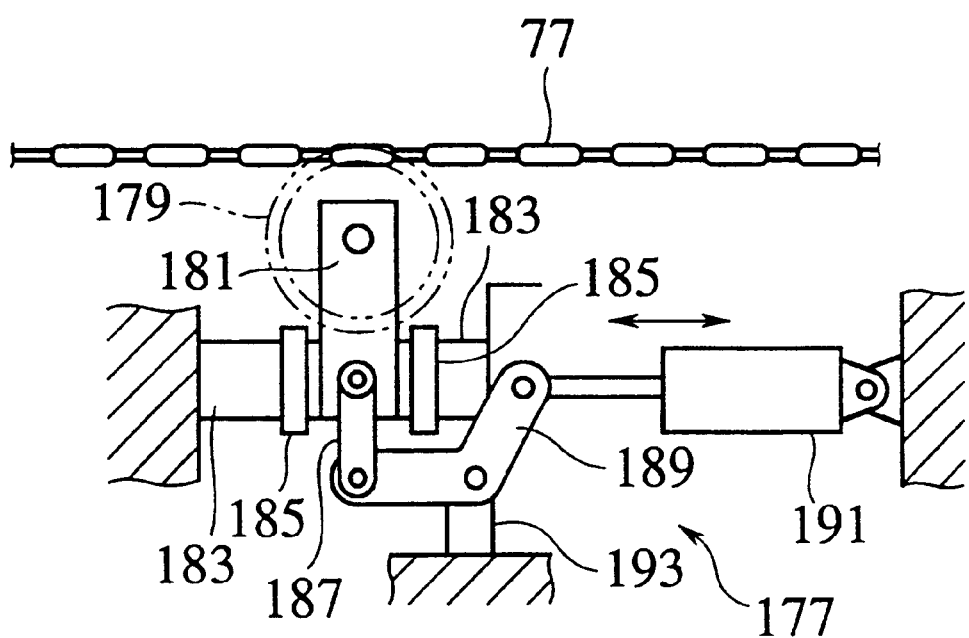
FIG. 23 is a plan view which shows another embodiment of a tension generating mechanism shown in FIGS. 18 and 19.

FIG. 23 shows another embodiment of a tension generating mechanism shown in FIGS. 18 and 19. A tension generating mechanism 177 in this case comprises a plurality of tension generating mechanisms provided along the length direction of the chain 77 with substantially an equal interval, and applies and remove the tension by a vertically movable sprocket 179. The sprocket 179 mentioned above is rotatably mounted to an upper end of a supporting plate 181, and the supporting plate 181 can vertically move with respect to a pair of right and left supporting brackets 183 fixed in the outer portion through a linear guide rail 185.

An upper end of a linear link member 187 is rotatably connected to the lower portion of the supporting plate 181, and an end of a bell crank 189 is rotatably connected to the lower end of the link member 187. In the bell crank 189, the other end is rotatably mounted to a rod front end of an air cylinder 191, and a center bent portion is rotatably mounted to a mounting bracket 193 fixed to the outer portion, so that the sprocket 179 is vertically moved through the bell crank 189, the link member 187 and the mounting plate 181 by the operation of the air cylinder 191.

The tension is applied to the chain 77 by ascending the sprocket 179, and the moving body 47 is transferred in this state. The moving body 47 is positioned in a state that the sprocket 179 is descended and the chain 77 is slackened.

Figure 24:
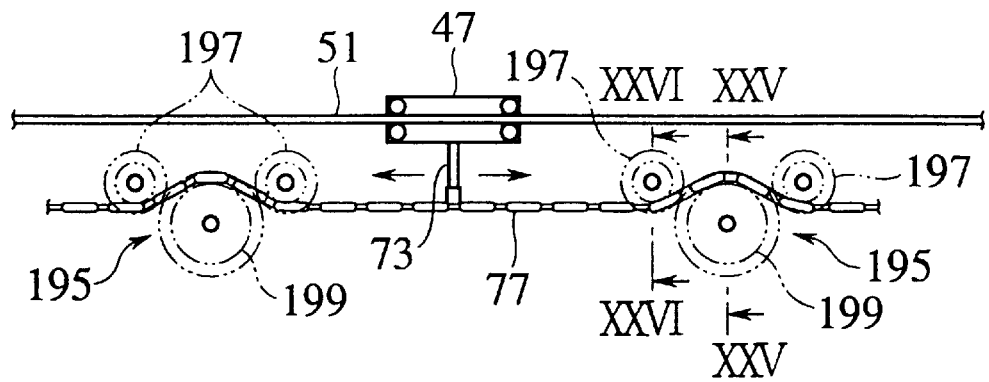
FIG. 24 is a plan view which shows a main portion of the chain conveyor provided with a work positioning apparatus in accordance with the other embodiment of the present invention.

FIG. 24 shows a structure that the moving body 47 is positioned by applying a tension against the chain 77 by means of a tension applying mechanism 195 provided in front of and in the rear of the transfer direction thereof in a state that the moving body 47 is stopped at a predetermined operating position. The moving body 47 is stopped at a predetermined operating position by detecting the moving body 47 by means of the sensor (not shown) constituting an operating position detecting means provided in the side of the moving body 47. The moving body 47 moves with being guided by the guide rail as in the same manner as that of the embodiment mentioned above, and further, the lower end thereof is connected to the chain 77.

The tension applying mechanism 195 is provided with a pair of rotatable guide sprockets 197 which are fixed and disposed in the above portion of the chain 77 with a predetermined interval to each other, and a movable tension control sprocket 199 which is positioned in the below portion of the chain 77 with respect to the respective guide sprockets 197 and between the respective guide sprockets 197 so as to urge the chain 77 upward. FIG. 24 shows a state that the tension control sprocket 199 moves upward so as to urge the chain 77 toward the guide sprockets 197.

Figure 25:
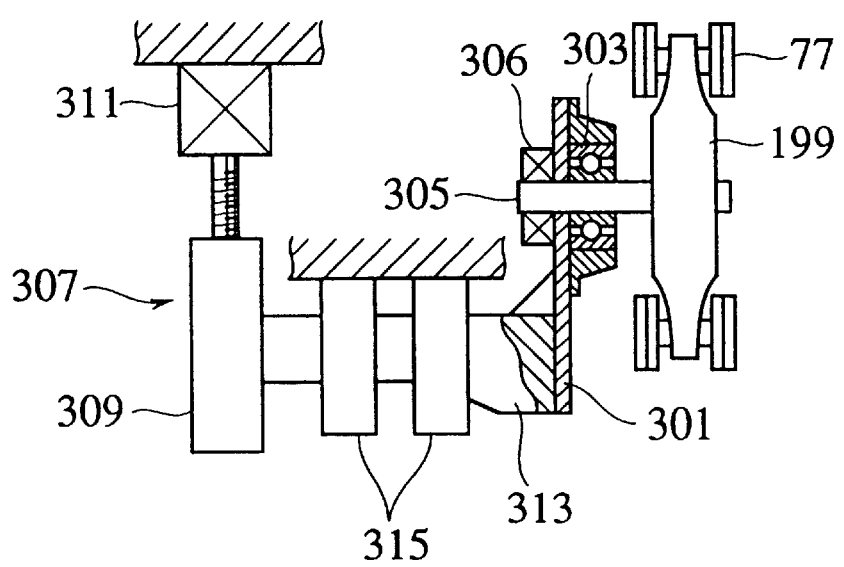
FIG. 25 is an enlarged cross sectional view as seen from a line XXV—XXV of FIG. 24.

FIG. 25 shows details of the tension control sprocket 199 in the tension applying mechanism 195 and corresponds to a cross sectional view along a line XXV—XXV of FIG. 24. A bearing 303 is fixed to a supporting plate 301, and the tension control sprocket 199 is fixed to a supporting shaft 305 rotatably supported to the bearing 303. Further, a brake mechanism 306 for locking the rotational operation of the supporting shaft 305 is mounted to the supporting plate 301 in the end opposite to the bearing 303.

A vertical motion driving mechanism 307 for vertically moving the tension control sprocket 199 together with the supporting plate 301 comprises a ball thread portion 309 and a servo motor 311 fixed to the outer portion. The ball thread portion 309 and the supporting plate 301 are connected and fixed by a supporting arm 313, and the supporting arm 313 is supported in such a manner as to vertically moving with respect to a linear guide rail 315 fixed to the outer portion.

Figure 26:
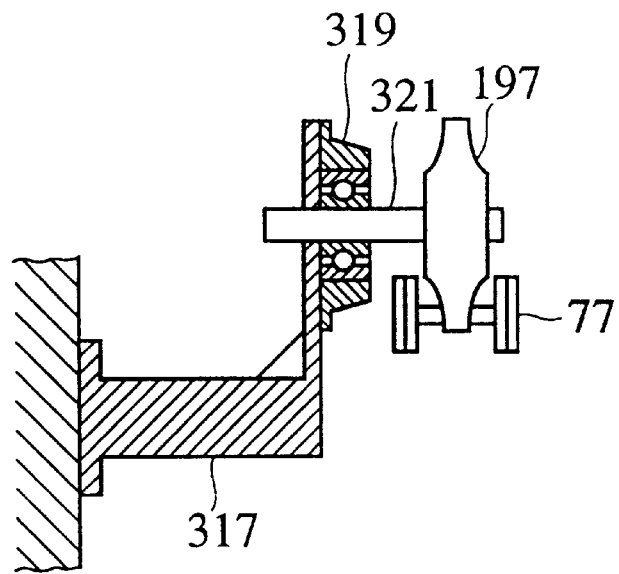
FIG. 26 is an enlarged cross sectional view as seen from a line XXVI—XXVI of FIG. 24.

FIG. 26 shows details of the guide sprocket 197 in the tension applying mechanism 195, and corresponds to a cross sectional view along a line XXVI—XXVI of FIG. 24. A bearing 319 is fixed to a supporting bracket 317 having a substantial L-shape, and the guide sprocket 197 is fixed to a supporting shaft 321 rotatably supported to the bearing 319.

In the positioning apparatus shown in FIG. 24, when the moving body 47 transfers the held work W by driving the chain 77, the servo motor 311 is driven so that the tension control sprocket 199 is descended from the position shown in FIG. 24 together with the supporting plate 301 through the ball thread portion 309 and the supporting arm 313, thereby removing the tension application to the chain 77, and the brake mechanism 306 is removed so that the rotation of the tension control sprocket 199 is made free. The tension control sprocket 199 in a state that the tension application is removed becomes meshed with the chain 77 together with the guide sprocket 197, thereby serving as a chain guide.

When the sensor (not shown) detects that the moving body 47 transferring the work W moves to a predetermined operating position, the drive of the chain 77 is stopped, and then in this state, the servo motor 311 is driven and the tension control sprocket 199 is ascended so as to make the tension control sprocket 199 a state shown in FIG. 24. At this time, the brake mechanism 306 is operated so that the rotational operation of the tension control sprocket 199 is locked. Accordingly, the tension is generated in the chain 77 between two tension applying mechanisms 195, thereby positioning the moving body 47 which is stopped at a predetermined operating position.

In the positioning apparatus shown in FIG. 24, since the tension control sprocket 199 supports the chain 77 even when the chain is driven, the driving force is dispersed to all the length of the chain 77 so that the impact due to the slack at a time of driving and stopping of the chain 77 is softened, so that the life of the chain 77 is extended.

Figure 27:
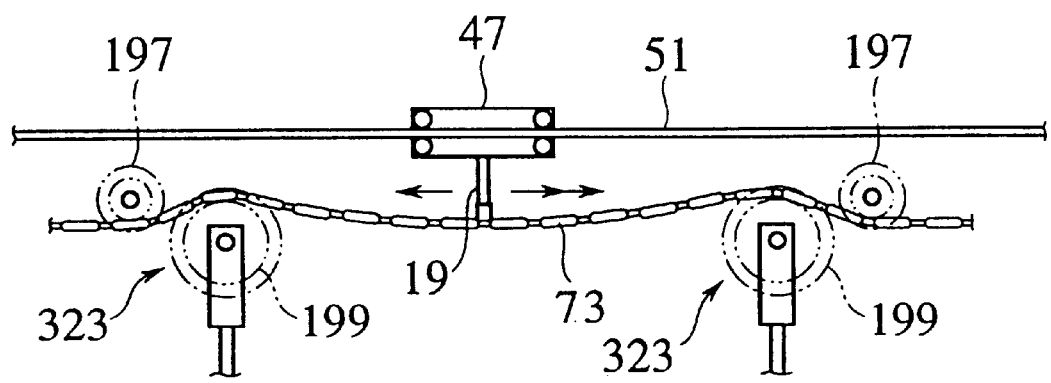
FIG. 27 is a plan view which shows a main portion of the chain conveyor in accordance with a modified embodiment of FIG. 24.

FIG. 27 shows a modified embodiment of FIG. 24. In this embodiment, at a time of positioning the moving body 47 which is detected by the sensor and stops at a predetermined operating position, the tension is applied to the chain between two tension applying mechanisms 323 as in the same manner as that of the embodiment shown in FIG. 24. In this case, the tension applying mechanism 323 is structured such that the guide sprocket 197 is integrally formed with the outer side of the tension control sprocket 199, and that the structure for supporting the periphery of the tension control sprocket 199 and the guide sprocket 197 is the same as that of FIGS. 25 and 26.

The tension is applied to the chain 77 between the tension applying mechanisms 323 by ascending the tension control sprocket 199 in a state of being locked by the brake mechanism 306. At that time, the tension is applied to the chain 77 at a portion between the tension control sprocket 199 and the chain mounting portion 73 mounted to the lower portion of the moving body 47. Accordingly, in this case, since it is necessary that the moving body 47 is supported by the guide rail 51, it is insufficient that the moving body 47 for transferring the work is fixed to the chain 77 so that the guide rail 51 is indispensable.

In FIGS. 24 and 27, it is possible to make the structure such that the guide sprocket 197 is disposed in the lower portion of the chain 77 and the tension control sprocket 199 is disposed in the upper portion of the chain 77, respectively, so that the tension is generated by moving the tension control sprocket 199 downward.

With respect to the pair of tension applying mechanisms 195 and 323 in FIGS. 24 and 27, in the case that the plurality of moving bodies 47 are provided and the respective moving bodies 47 are positioned, as shown in the embodiment of FIG. 18, the tension applying mechanism 195 and 323 are provided in the respective moving bodies 47. Further, by making a distance between the tension applying mechanisms 195 and 323 as short as possible, the extension of the chain 77 at the portion where the tension is applied due to the pin abrasion is reduced, so that the positioning accuracy can be improved.

Figure 28:
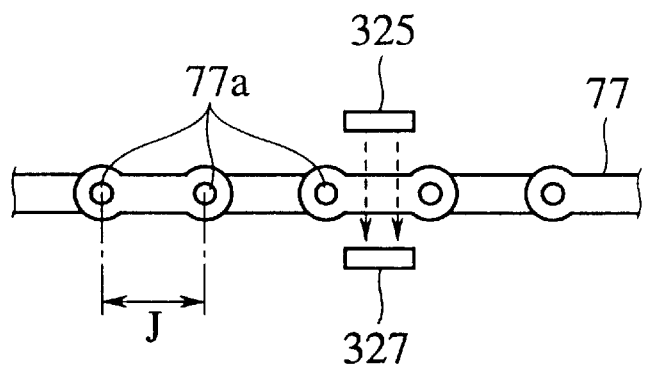
FIG. 28 is a schematic view explaining an example in which a slack amount of the chain is determined by detecting a dimension between pins.

At a time of applying the tension to the chain 77 in FIGS. 24 and 27, more secure positioning can be performed by controlling the ascending amount of the tension control sprocket 199 in accordance with the slack amount of the chain 77 due to the abrasion of the pin. Then, as shown in FIG. 28, a laser light source 325 is disposed in the upper portion of the chain 77 and a CCD camera 327 is disposed in the lower portion of the chain 77, respectively, and these elements detect a dimension J between pins 77a of the chain 77, whereby the extension of the chain 77 due to the abrasion of the pin 77a, that is, the slack amount is determined, and the ascending amount of the tension control sprocket 199 is controlled by the servo motor 311 in accordance with this slack amount.

The laser light source 325 and the CCD cameral 327 constitute a slack detecting means, and a control circuit, for example, comprising a microcomputer can be used for a control means for controlling the servo motor 311 in accordance with the detected value of the slack detecting means, which is not illustrated.

Figure 29:
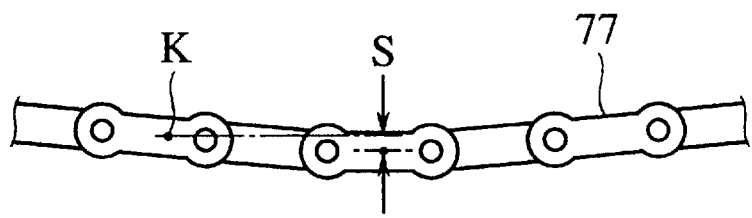
FIG. 29 is a schematic view explaining an example in which a slack amount of the chain is determined by detecting an amount of a downward displacement of a reference mark provided on the chain.

FIG. 29 shows a structure in which the slack amount of the chain 77 is determined by detecting a vertical dimension difference S between a value before slacking and a value after slacking of the reference mark K provided in the chain 77 by means of a visual sensor (not shown).

Figure 30:
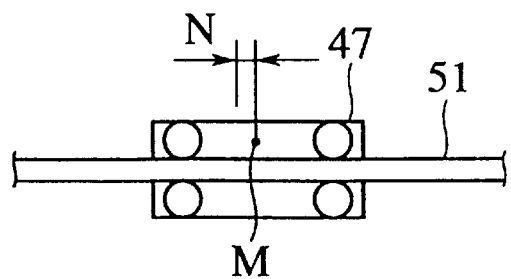
FIG. 30 is a schematic view explaining an example in which a slack amount of the chain is determined by detecting an amount of a displacement of a reference mark provided on a slat in a transferring direction.

FIG. 30 shows a structure in which the slack amount of the chain 77 is determined by detecting a shift amount N in the transfer direction of the reference mark M provided on the moving body 47 with respect to a predetermined operating position by means of the visual sensor (not shown).

The slack amount detecting structures in FIGS. 28 and 39 can be solely employed or all of them can be employed so as to feedback to the servo motor 311.

In the tension applying mechanism 195 in FIGS. 24 and 27, the sprockets 197 and 199 are used, however, the guide shoe may be used in place of the sprocket.

Figure 31:
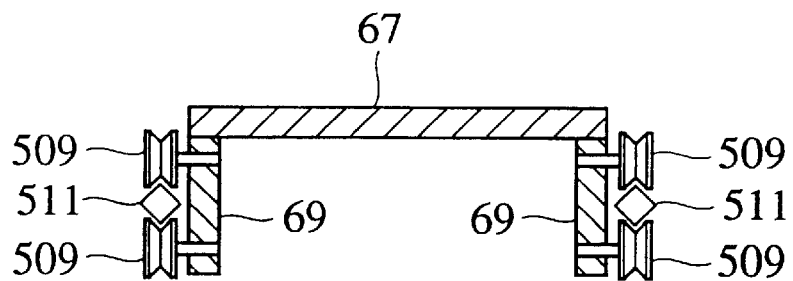
FIG. 31 is a cross sectional view which shows another embodiment of a displacement restricting structure of the moving body in FIG. 11.
Figure 33:
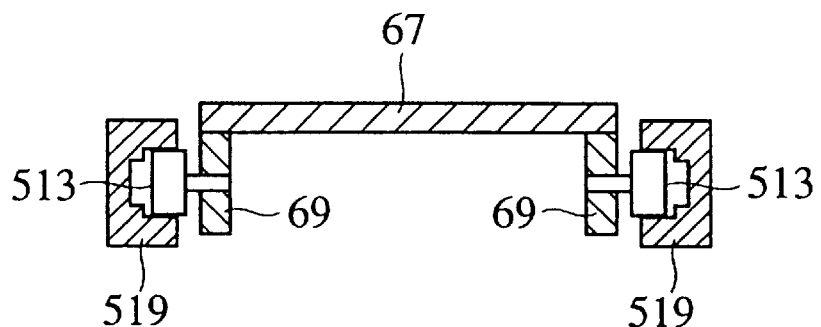
FIG. 33 is a cross sectional view which shows a modified embodiment of the displacement restricting structure of the moving body in FIG. 32.

FIGS. 31 and 33 show the other embodiment of the cam follower and the guide rail structure in the transfer apparatus 3. In the embodiment shown in FIG. 31, eight cam followers 509 are used as in the same manner as that of FIG. 1 and are disposed to hold a guide rail 511 between the upper and lower portions, however, in this case, a shape of the cam follower 509 is a pulley shape having a V-shaped groove in a central portion and the guide rail 511 is disposed in such a manner as to align with the V-shaped groove.

Figure 32:
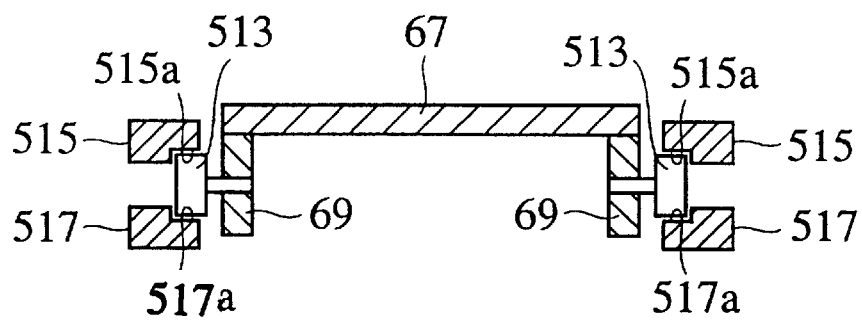
FIG. 32 is a cross sectional view which shows the other embodiment of the displacement restricting structure of the moving body in FIG. 11.

FIG. 32 shows a structure in which a cam follower 513 is respectively provided in a front and rear portions of a right and left side plates 69 in the transfer direction, and these four cam followers 513 are disposed in such a manner as to be held in the upper and lower portions by guide rails 515 and 517 vertically separated, in the right and left portions. Notch recess portions 515a and 517a are respectively formed on the guide rails 515 and 517, and the cam follower 513 is inserted into the respective notch recess portions 515a and 517a for movement.

FIG. 33 shows a structure in which the cam follower 513 has the same structure as that of FIG. 32, the guide rails 515 and 517 in FIG. 32 are integrally formed to make a guide rail 519.

In the embodiments shown in FIGS. 31 to 33, as in the same manner as that shown in FIG. 11, since the moving body 47 is held in a state of restricting the displacement with respect to the guide rails 511, 515, 517 and 519 through the cam follower 509 and 513, the transferring operation can be stably performed, and the welding operation can be performed with a high accuracy.

Figure 34:
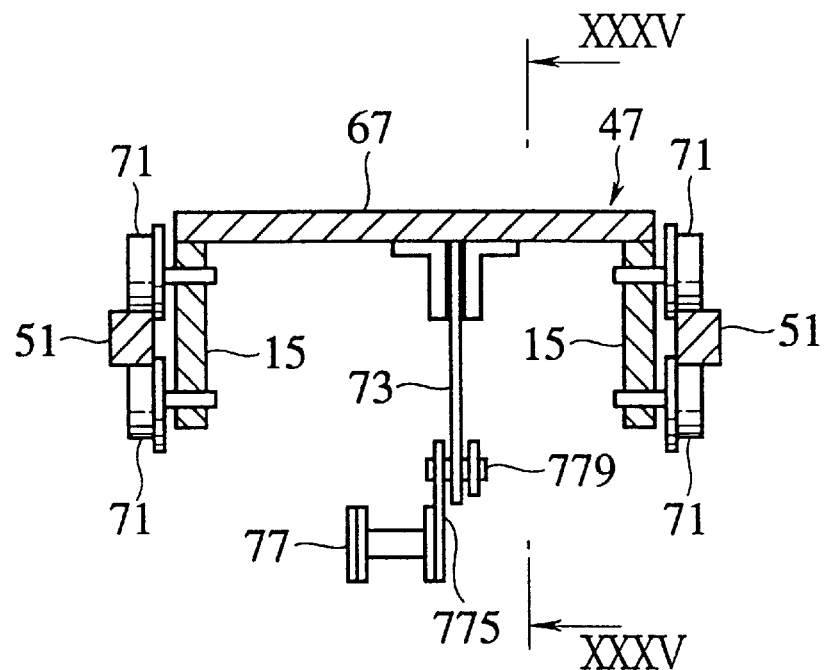
FIG. 34 is a cross sectional view which shows the other embodiment of a connecting structure between the chain and the moving body shown in FIG. 11.
Figure 35:
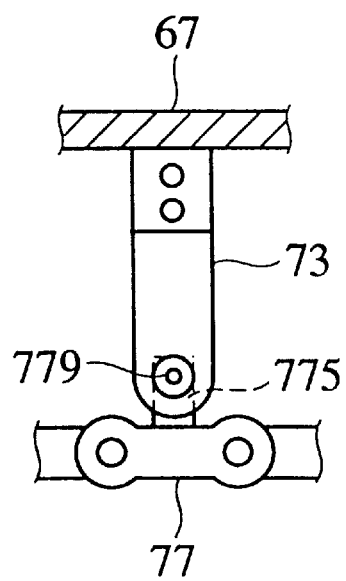
FIG. 35 is a cross sectional view along a line XXXV—XXXI of FIG. 34.

FIGS. 34 and 35 show the other embodiments in which in FIG. 11, the chain is shifted and connected to the chain mounting portion 73.

In this case, in the third stage R in FIG. 3, the inner parts 13 and 15 are temporarily welded in a state that the body side outer 7 is positioned from the side surface thereof by the tetrahedron positioning apparatus 23, however, a robot hand jig in which an exclusive jig for each of the cars for positioning the body side outer 7 is mounted to the front end of the robot hand in such a manner as to be capable of replacing the jig, can be employed in place of the tetrahedron positioning apparatus 23.

As described above, in accordance with a first aspect of the present invention, there is provided a transfer apparatus transferring a body side of an automotive vehicle, comprising: a moving body provided in a transfer line; and a clamp member provided on the moving body for fixing and positioning a lower end of a side sill of a body side outer in an upright position in such a manner that a roof rail end of the body side outer is an upper portion and the side sill end of the body side outer is a lower portion.

In accordance with the transfer apparatus for transferring the body side of the automotive vehicle, since the lower end of the side sill can be made the same shape between different kinds of cars, the lower end of the side sill of the body side outer can be fixed in an upright position, so that it is unnecessary to provide an exclusive jig for each of the kinds of cars for fixing and holding the body side outer. Accordingly, the fixing device for positioning and fixing the body side outer can be easily simplified and used for various kinds of cars. Further, since the plurality of welding robots perform a welding operation with respect to the body side outer in the upright position, interference between the robots can be avoided so that the operation efficiency can be improved. Further, since the body side outer is transferred and welded in the upright position corresponding to a direction in which a bending rigidity in a cross section of the work becomes maximum with respect to a direction of operating the own weight of the body side outer, the body side outer is hard to be deformed in comparison with the state of horizontally laying down, so that the assembling accuracy can be improved and a space for operation can be reduced.

In accordance with a second aspect of the present invention, there is provided a structure in which the clamp member is structured in such a manner as to hold and fix the lower end of the side sill of each of the front part and the rear fender part constituting the body side outer between the right and left portions thereof perpendicular to the transfer direction in a state of vertically positioning the parts, and to be provided with a positioning projection for positioning in the transfer direction by being inserted into a notch formed on the lower end of the side sill, on the moving body.

In accordance with the assembling apparatus mentioned above, since the clamp member holds and fixes the lower end of the side sill of each of the front part and the rear fender part, the parts can be positioned in the vertical direction and the lateral direction which is perpendicular to the transfer direction. In addition to this, since the positioning projection is inserted into the notch disposed in the lower end of the side sill, the parts can be positioned in the transfer direction.

In accordance with a third aspect of the present invention, there is provided a structure in which the moving body is structured in such a manner as to be mounted on the chain provided along the transfer line, be provided with a cam follower on both longitudinal ends of both the lateral side portions which is perpendicular to the transfer direction, and to be provided with a guide rail movable along the transfer direction with supporting the cam follower and restricting a displacement in the lateral direction and the vertical direction with respect to the transfer direction of the cam follower, in both sides of the chain.

In accordance with the assembling apparatus mentioned above, since the cam follower mounted on the moving body is supported with being restricted the displacement in the lateral direction and the vertical direction with respect to the transfer direction by the guide rail, the positioning accuracy of the body side can be securely maintained, the weight of the body side does not reach the chain, and the welding operation and the transfer operation can be stably performed.

In accordance with a fourth aspect of the present invention, there is provided a structure in which the cam follower is disposed at right and left in front of the moving body and right and left in the rear thereof in such a manner as to hold the upper and lower of the guide rail therebetween.

In accordance with the assembling apparatus mentioned above, since the moving body is restricted the displacement in the lateral direction and the vertical direction with respect to the transfer direction by the cam follower disposed in such a manner as to hold the upper and lower of the guide rail therebetween, the welding operation and the transferring operation can be stably performed.

In accordance with a fifth aspect of the present invention, there is provided a structure in which the guide rail is disposed in such a manner as to hold the upper and lower of the cam follower which is provided at the right and left in front of the moving body and the right and left in the back thereof therebetween.

In accordance with the assembling apparatus mentioned above, since the moving body is restricted the displacement in the lateral direction and the vertical direction with respect to the transfer direction by the guide rail disposed in such a manner as to hold the upper and lower of the cam follower therebetween, the welding operation and the transfer operation can be stably performed.

In accordance with a sixth aspect of the present invention, there is provided a structure in which a work holding and transfer member for holding and transferring the work to be operated at a predetermined transfer position of the chain is attached to the chain wound between a pair of sprockets, a tension generating mechanism for generating a tension against the chain is provided, and a positioning mechanism for positioning the work holding and transferring member in such a manner that the work is positioned at a predetermined operating position in a state of removing the tension against the chain by the tension generating mechanism is provided.

In accordance with the structure mentioned above, the work held by the work holding and transferring member which is positioned by the positioning mechanism in a state of removing the tension against the chain by the tension generating mechanism is performed the predetermined welding operation and the like, for example, by the robots.

Accordingly, since the positioning is performed to the work holding and transferring member mounted on the chain in a state of removing the tension against the chain, the positioning can be easily and stably performed.

In accordance with a seventh aspect of the present invention, there is provided a structure in which a work holding and transferring member for holding and transferring the work to be operated at a predetermined transfer position of the chain is attached to the chain wound between a pair of sprockets, a clutch mechanism capable of transmitting and intercepting a power from the drive portion with respect to the sprocket is provided in a driving end sprocket among the pair of sprockets, and a positioning mechanism for positioning the work holding and transferring member in such a manner that the work is positioned at a predetermined operating position in a state of intercepting the transmission of the power to the sprocket by the clutch mechanism so as to make the sprocket free is provided.

In accordance with the structure mentioned above, the positioning mechanism positions the work holding and transferring member in a state that the driving end sprocket is intercepted the power transmission from the drive portion by the clutch mechanism. Accordingly, the driving end sprocket is made free at a time of positioning, the sprocket is not restricted.

In accordance with an eighth aspect of the present invention, there is provided a structure in which the work holding and transferring member is structured in such a manner as to be moved by driving the chain in a state of being supported by the guide rail provided on both sides of the chain.

In accordance with the structure mentioned above, since the work holding and transferring member is supported by the guide rail, a shift of the position can be avoided so that the positioning mechanism can easily position the work holding and transferring member.

In accordance with a ninth aspect of the present invention, there is provided a structure in which the positioning mechanism comprises a taper pin provided in any one side of the drive means disposed in the side of the work holding and transferring member and the work holding and transferring member, and a taper hole portion provided in the other side and inserting the taper pin therein, in which the drive means moves the taper pin or the taper hole portion provided on the drive means toward the work holding and transferring member.

In accordance with the structure mentioned above, since the drive means moves the taper pin or the taper hole portion provided on the drive means toward the work holding and transferring member so as to fit into the taper hole portion or the taper pin of the work holding and transferring member, respectively, the work holding and transferring member can be positioned.

Accordingly, positioning with respect to the work holding and transferring member is performed by respectively fitting the taper pin or the taper hole portion of the drive means into the taper hole portion or the taper pin of the work holding and transferring member to each other, so that the positioning can be securely performed.

In accordance with a tenth aspect of the present invention, there is provided a structure in which the positioning mechanism comprises a held portion provided in the work holding and transferring member and a holding arm mechanism provided in the side of the work holding and transferring member and holding and fixing the held portion.

In accordance with the structure mentioned above, since the holding arm holds and fixes the held portion of the work holding and transferring member, the work holding and transferring member can be positioned.

In accordance with an eleventh aspect of the present invention, there is provided a structure in which a work holding and transferring member for holding and transferring the work to be operated at a predetermined transfer position of the chain is attached to the chain wound between a pair of sprockets, a operating position detecting means for detecting a state that the work holding and transferring member becomes a predetermined operating position with respect to the held work is provided, and a tension applying mechanism for applying a tension against the chain between both sides of the work transfer direction of the work holding and transferring member when the operating position detecting means detects a predetermined operating position state of the work holding and transferring member is provided.

In accordance with the structure mentioned above, when the operating position detecting means detects the state that the work holding and transferring member becomes a predetermined operating position with respect to the work, the tension is generated on both sides of the chain in the work transferring direction of the work holding and transferring member by the operation of the tension applying mechanism, whereby a predetermined operating position of the work can be secured.

Since the work holding and transferring member applied a tension to the chain on both sides of the work holding and transferring member in the work transferring direction in a state that the work holding and transferring becomes a predetermined operating position with respect to the work, a predetermined operating position with respect to the work can be secured.

In accordance with a twelfth aspect of the present invention, there is provided a structure in which the tension applying mechanism comprises a pair of guide sprockets positioned in one side of the vertical direction with respect to the chain and disposed at a predetermined interval to each other, and a tension control sprocket positioned in the other side of the chain disposed in the opposite side of each of the guide sprockets and between the guide sprockets and capable of urging the chain toward the guide sprocket, in which the guide sprocket and the tension control sprocket are respectively disposed in both sides of the work holding and transferring member in the work transferring direction.

In accordance with the structure mentioned above, when the tension control sprocket urges the chain to the guide sprocket, the chain enters into a portion between the guide sprocket and the tension control sprocket and is pulled between the tension applying mechanisms disposed in both sides of the work holding and transferring member in the work transferring direction so as to generate a tension.

Accordingly, since the tension control sprocket is urged to the guide sprocket, the tension can be applied to the chain in both sides of the work holding and transferring member in the work transferring direction.

In accordance with a thirteenth aspect of the present invention, there is provided a structure in which the work holding and transferring member is structured in such a manner as to move by driving the chain in a state of being supported by the guide rail provided in both sides of the chain, and the tension applying mechanism comprises the guide sprocket positioned at one side of the chain in the vertical direction and the tension control sprocket positioned at the work holding and transferring member side with respect to the guide sprocket and capable of urging to the guide sprocket side with respect to the chain, in which the guide sprocket and the tension control sprocket are respectively disposed at both sides of the work holding and transferring member in the work transferring direction.

In accordance with the structure mentioned above, when the tension control sprocket urges the chain to the guide sprocket, the chain is pulled in the portion between the work holding and transferring member supported by the guide rail and the tension control sprocket so as to generate a tension between the tension applying mechanisms disposed at both sides of the work holding and transferring member in the work transferring direction.

In accordance with a fourteenth aspect of the present invention, there is provided a structure in which the tension control sprocket is provided with a servo motor for urging and moving toward the guide sprocket, a slack detecting means for detecting a slack of the chain, and a control means for driving the servo motor in response to an amount of the slack of the chain detected by the slack detecting means.

In accordance with the structure mentioned above, when the slack detecting means detects the slack of the chain, the control means drives the servo motor in response to the slack amount so as to urge the tension control sprocket to the guide sprocket.

Accordingly, since the optimum tension can be obtained in response to the slack amount of the chain, the positioning accuracy can be improved.

In accordance with a fifteenth aspect of the present invention, there is provided a structure in which the slack detecting means detects a pitch between pins of the chain.

In accordance with the structure mentioned above, since the total length of the chain is extended and slackened due to the abrasion of the pin, the extension of the chain can be observed by detecting the pitch between the pins, so that the slack amount of the chain can be detected.

In accordance with a sixteenth aspect of the present invention, there is provided a structure in which the slack detecting means detects the slack amount downward with respect to an upright position provided on the chain.

In accordance with the structure mentioned above, the standard position provided on the chain displaces downward due to the slack of the chain, and the slack amount can be detected by detecting the displaced position.

In accordance with a seventeenth aspect of the present invention, there is provided a structure in which the slack detecting means is provided in the work holding and transferring member and detects the shift amount of the transfer direction with respect to the standard position in correspondence to the predetermined operating position of the work.

In accordance with the structure mentioned above, the standard position provided in the work holding and transferring member is shifted to the transferring direction with respect to the predetermined operating position of the work due to the slack of the chain, and the slack amount can be detected by detecting the shift amount.

In accordance with an eighteenth aspect of the present invention, there is provided a structure in which the tension control sprocket is provided with a brake mechanism for locking a rotational operation at a time of applying the tension to the chain.

In accordance with the structure mentioned above, since the tension control sprocket is urged to the guide sprocket in a state of being locked by the brake mechanism, the tension can be securely generated on the chain.

In accordance with a nineteenth aspect of the present invention, there is provided a transfer method in such a manner as to assemble the body side by positioning and fixing the lower end of the side sill by means of a welding operation in a state of standing up the body side outer so as to make the roof rail end upper and the side sill end lower.

In accordance with the transfer method mentioned above, the same function and effect as those of the first aspect mentioned above can be obtained.

In accordance with a twentieth aspect of the present invention, there is provided a transfer method in such a manner that the body side outer comprises the front part and the rear fender part, and is transferred on the transfer line in a state that the lower end of the side sill of each of the parts is positioned and fixed, and that a welding operation to the respective parts to each other and a setting operation and a welding operation of the inner parts to the respective parts are performed at a predetermined position on the transfer line.

In accordance with the transfer method mentioned above, the welding operation of the front part and the rear fender part constituting the body side outer, and the welding operation of the inner parts with respect to the respective parts can be performed without inviting a high cost and with a high efficiency and an improved accuracy.

In accordance with a twenty-first aspect of the present invention, there is provided a transfer method in such a manner that the positioning jig disposed in the side of the transfer line advances into the front part and the rear fender part positioned on the transfer line so as to position the respective parts from the side portion, so that the setting of the inner parts and the welding thereof are performed in this state.

In accordance with the transfer method mentioned above, since the positioning jig disposed in the side of the transfer line advances into the front part and the rear fender part positioned on the transfer line so as to position from the side portion thereof, the setting operation and the welding operation of the inner parts can be performed at a more secure manner.

In accordance with a twenty-second aspect of the present invention, there is provided a transfer method in which the positioning of the body side outer is performed in such a manner as to hold and fix the lower end of the side sill by a cramp means provided on the moving body of the transfer line in the lateral direction perpendicular to the transferring direction and in the vertical direction, and to insert the positioning projection provided on the moving body into the notch formed on the lower end of the side sill in the transferring direction.

In accordance with the transfer method mentioned above, the positioning of the body side outer can be securely performed by a simple structure in the lateral direction with respect to the transferring direction and the vertical direction, and the transferring direction.

In accordance with a twenty-third aspect of the present invention, there is provided a positioning method in such a manner as to position the work holding and transferring member such that the work holding and transferring member for holding and transferring the work is attached to the chain wound between a pair of sprockets, and that the work becomes a predetermined operating position at a time of operating a predetermined operation with respect to the work held by the work holding and transferring member.

In accordance with the work positioning method mentioned above, since the work holding and transferring member transferred by the chain the total length of which is changed due to the abrasion of the pin and the temperature change is positioned and fixed at the predetermined operating position with respect to the held work, the operation accuracy, for example, the welding accuracy in the case that the operation with respect to the positioned and fixed work is welding operation by the robots is improved.

In accordance with a twenty-fourth aspect of the present invention, there is provided a positioning method is structured in such a manner that a plurality of work holding and transferring members are provided along the transferring direction of the chain and the positioning with respect to the plurality of work holding and transferring members is successively performed from any of a pair of sprockets.

In accordance with the work positioning method mentioned above, restriction by the chain can be avoided by successively positioning from any of the sprockets disposed in both ends with respect to the plurality of work holding and transferring members. Accordingly, the positioning can be easily performed.

While preferred embodiments of the present invention have been described using specific terms, such description is for illustrative purposes, and it is to be understood that changes and variations may be made without departing from the spirit or scope of the following claims.

What is claimed is:

1. The transfer apparatus transferring a body side of an automotive vehicle, comprising:
   a transfer line;
   a moving body provided in the transfer line;
   a clamp member provided on the moving body that clamps only a lower end of a side sill of a body side outer in an upright position such that a roof rail end of the body side outer is an upper portion and the side sill end of the body side outer is a lower portion;
   a chain provided along the transfer line;
   cam followers provided at both longitudinal ends of both lateral side portions of the moving body; and
   a pair of guide rails located near both lateral side portions of the moving body, the guide rails supporting the cam followers so that the moving body is movable in the transfer direction and restricting displacement of the cam followers in the lateral direction and the vertical direction with respect to the transfer direction,
   wherein the moving body is attached to the chain; and
   wherein at least one of the cam followers is disposed at a front-right side, a front-left side, a rear-right side and a rear-left side of the moving body such that the moving body holds upper and lower sides of the guide rail therebetween.

2. The transfer apparatus transferring a body side of an automotive vehicle, comprising:

a transfer line;

a moving body provided in the transfer line;

a clamp member provided on the moving body that clamps only a lower end of a side sill of a body side outer in an upright position such that a roof rail end of the body side outer is an upper portion and the side sill end of the body side outer is a lower portion;

a chain provided along the transfer line;

cam followers provided at both longitudinal ends of both lateral side portions of the moving body; and a pair of guide rails located near both lateral side portions of the moving body, the guide rails supporting the cam followers so that the moving body is movable in the transfer direction and restricting displacement of the cam followers in the lateral direction and the vertical direction with respect to the transfer direction, wherein the moving body is attached to the chain; and wherein at least one of the cam followers is disposed at an upper-right side, a lower-right side, an upper-left side, and a lower-left side of the moving body such that the guide rail is disposed between upper and lower cam followers provided at the right and left of the moving body.

3. The transfer apparatus transferring a body side of an automotive vehicle, comprising:

a transfer line;

a moving body provided in the transfer line;

a clamp member provided on the moving body that clamps only a lower end of a side sill of a body side outer in an upright position such that a roof rail end of the body side outer is an upper portion and the side sill end of the body side outer is a lower portion;

a pair of sprockets disposed substantially at either end of the transfer line;

a chain wound between the pair of sprockets;

a work holding and transfer member attached to the chain that holds and transfers the body side outer at a predetermined transfer position;

a tension generating mechanism that generates tension in the chain; and a positioning mechanism that positions the work holding and transferring member such that the body side outer is positioned at a predetermined operating position when the tension in the chain is removed by the tension generating mechanism.

4. The transfer apparatus transferring a body side of an automotive vehicle according to claim 3, wherein the pair of sprockets includes a driving end sprocket, wherein the tension generating mechanism comprises a clutch mechanism, which is capable of transmitting and intercepting power from a drive portion, provided near the driving end sprocket, and wherein the positioning mechanism positions the work holding and transferring member such that the body side outer is positioned at a predetermined operating position when the clutch mechanism intercepts the transmission of the power to the driving end sprocket.

5. The transfer apparatus transferring a body side of an automotive vehicle according to claim 3, further comprising at least one guide rail disposed on either side of the chain and extending along the transfer line, and wherein the work holding and transferring member is moved by the chain when the work holding and transferring member is supported by the guide rail.

6. The transfer apparatus transferring a body side of an automotive vehicle according to claim 3, further comprising:

a taper hole provided in one of the work holding and transferring member and the positioning mechanism; and a taper pin provided in the other of the work holding and transferring member and the positioning mechanism; and a drive element that moves the positioning mechanism toward the work holding and transferring member such that the taper pin is inserted into the taper hole.

7. The transfer apparatus transferring a body side of an automotive vehicle according to claim 3, wherein the work holding and transferring member has a held portion, and the positioning mechanism has a holding arm mechanism provided to the side of the work holding and transferring member that holds and fixes the held portion.

* * * * *